United States Patent
Hibbert et al.

(10) Patent No.: US 9,467,465 B2
(45) Date of Patent: *Oct. 11, 2016

(54) SYSTEMS AND METHODS OF RISK BASED RULES FOR APPLICATION CONTROL

(71) Applicant: BeyondTrust Software, Inc., Phoenix, AZ (US)

(72) Inventors: Brad Hibbert, Carp (CA); Chris Silva, Laguna Beach, CA (US)

(73) Assignee: BeyondTrust Software, Inc., Phoenix, AZ (US)

( * ) Notice: Subject to any disclaimer, the term of this patent is extended or adjusted under 35 U.S.C. 154(b) by 71 days.

This patent is subject to a terminal disclaimer.

(21) Appl. No.: 14/182,651

(22) Filed: Feb. 18, 2014

(65) Prior Publication Data
US 2014/0245376 A1    Aug. 28, 2014

Related U.S. Application Data

(63) Continuation-in-part of application No. 14/156,375, filed on Jan. 15, 2014.

(60) Provisional application No. 61/768,809, filed on Feb. 25, 2013.

(51) Int. Cl.
*H04L 29/06* (2006.01)
*G06F 21/57* (2013.01)
*G06F 21/55* (2013.01)

(52) U.S. Cl.
CPC ......... *H04L 63/1433* (2013.01); *G06F 21/554* (2013.01); *G06F 21/577* (2013.01); *H04L 63/20* (2013.01)

(58) Field of Classification Search
CPC ............ H04N 21/643; H04L 47/2441; H04L 63/0245; H04L 45/306; H04L 47/14; H04L 69/329; H04L 67/34; H04W 28/06; H04W 24/02; H04M 1/72525; G06F 21/31; G06F 21/316; G06F 21/36; G06F 21/55; G06F 21/552; G06F 21/577; G06F 21/6218; G06F 21/6263; G06Q 20/341; G06Q 20/4014; G06Q 20/40145; G06Q 20/4016; G07F 7/1008; G07F 7/1041; G07F 7/1083
USPC ......... 726/1, 4; 713/166–167; 715/773, 830, 715/833; 455/418–420, 425; 707/802; 340/601
See application file for complete search history.

(56) References Cited

U.S. PATENT DOCUMENTS 5,535,383 A    7/1996    Gower
7,472,420 B1    12/2008    Pavlyushchik
(Continued)

FOREIGN PATENT DOCUMENTS

WO    2008049005    4/2008
WO    2012001667    1/2012

OTHER PUBLICATIONS

International Application No. PCT/US2014/016976, International Search Report and Written Opinion mailed Jul. 10, 2014.
(Continued)

*Primary Examiner* — Thanhnga B Truong
(74) *Attorney, Agent, or Firm* — Hankin Patent Law APC; Jimmy Sauz; Kevin Schraven

(57) ABSTRACT

In various embodiments, an agent on a digital device may comprise a monitor module, an application identification module, a vulnerability module, a rules database, and a rule module. The monitor module may be configured to monitor a device for an instruction to execute a legitimate application. The application identification module may be configured to identify one or more attributes of the legitimate application. The vulnerability module may be configured to retrieve risk information based on the one or more attributes of the legitimate application. The risk information may be determined from known vulnerabilities of the legitimate application. The rules database may be for storing a rule associated with the risk information. The rule module may be configured to retrieve the rule from the rule database based on the risk information and to control the legitimate application based on the rule.

31 Claims, 16 Drawing Sheets

(56) References Cited

U.S. PATENT DOCUMENTS

| | | | |
|---|---|---|---|
| 7,783,673 B2 * | 8/2010 | Schneider | G06Q 40/08 340/601 |
| 7,797,752 B1 | 9/2010 | Vaidya et al. | |
| 7,904,479 B2 | 3/2011 | Zuk | |
| 8,453,244 B2 | 5/2013 | Dai et al. | |
| 8,543,683 B2 * | 9/2013 | Kiciman | G06F 8/68 709/204 |
| 8,560,661 B2 | 10/2013 | Nazarov | |
| 8,738,906 B1 * | 5/2014 | Sampath | H04N 21/643 713/166 |
| 2002/0026591 A1 | 2/2002 | Hartley et al. | |
| 2003/0233581 A1 | 12/2003 | Reshef et al. | |
| 2007/0028303 A1 | 2/2007 | Brennan | |
| 2007/0094735 A1 | 4/2007 | Cohen et al. | |
| 2007/0169199 A1 | 7/2007 | Quinnell et al. | |
| 2007/0174824 A1 | 7/2007 | Relyea et al. | |
| 2007/0180509 A1 | 8/2007 | Swartz et al. | |
| 2007/0239999 A1 | 10/2007 | Honig et al. | |
| 2008/0172743 A1 | 7/2008 | Aaron | |
| 2010/0313035 A1 | 12/2010 | Turbin et al. | |
| 2010/0325707 A1 | 12/2010 | Iverson et al. | |
| 2011/0082845 A1 | 4/2011 | Padala et al. | |
| 2011/0296502 A1 | 12/2011 | Peretti | |
| 2012/0072968 A1 | 3/2012 | Wysopal et al. | |
| 2012/0323853 A1 | 12/2012 | Fries et al. | |
| 2013/0031633 A1 | 1/2013 | Honig et al. | |
| 2013/0246423 A1 | 9/2013 | Bhargava et al. | |

OTHER PUBLICATIONS

International Application No. PCT/US2014/011729, International Search Report and Written Opinion mailed Apr. 17, 2014.
Khan, Hassan et al., "Determining Malicious Executable Distinguishing Attributes and Low-Complexity Detection," Journal in Computer Virology, vol. 7, No. 2, pp. 95-105, Jan. 27, 2010.

* cited by examiner

SYSTEMS AND METHODS OF RISK BASED RULES FOR APPLICATION CONTROL

CROSS-REFERENCE TO RELATED APPLICATIONS

The present application claims the benefit of U.S. Provisional Patent Application Ser. No. 61/768,809, filed Feb. 25, 2013 and entitled "Systems and Methods of Risk Based Rules for Application Control," and is a continuation-in-part of U.S. Nonprovisional patent application Ser. No. 14/156,375, filed Jan. 15, 2014 and entitled "Systems and Methods for Identifying and Reporting Application and File Vulnerabilities," both of which are incorporated by reference herein.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field of the Invention(s)

The present invention(s) relate generally to application control. More particularly, the invention(s) relate to systems and methods for controlling applications utilizing risk based rules.

2. Description of Related Art

Recent computer attack trends target software vulnerabilities of home and corporate networks. These client-side attacks have proven fruitful for cyber criminals. Clients are an easier target than servers as servers tend to be more highly secured than workstations, with less end user interaction. As such, these client-side attacks offer the low-hanging fruit that hackers are seeking. By targeting end-users, hackers gain easier access to a larger number of computers, thereby producing the greater yield with the least amount of effort. A single vulnerability in a workstation's client applications may afford access to more important information assets on the same network. A client-side exploit can therefore leverage a compromised workstation as a launching point for attacks against other workstations or servers otherwise protected by perimeter defenses and accessible only via internal network.

Client-side exploits take advantage of vulnerabilities in client software, such as web browsers, email applications and media players (e.g., Internet Explorer, Firefox, Microsoft Outlook, Microsoft Media Player and RealNetworks' RealPlayer). Client-side exploits can also exploit vulnerabilities in system-wide libraries used by client applications. For example, a vulnerability in an image library that renders JPEG images might be exploitable via a web browser or an email application. Client-side exploits are not prevented by traditional perimeter defenses, such as firewalls and web proxies. Trends monitored by the SANS Institute (http://www.sans.org) and other industry organizations indicate that client-side vulnerabilities began to offset server-side vulnerabilities in 2005.

SUMMARY

In various embodiments, a method comprises receiving a plurality of records from a first digital device, each of the plurality of records generated during execution or termination of a different executable and containing information related to execution or termination of the different executable, retrieving at least one segment from at least one of the plurality of records, the at least one segment being less than all of the at least one of the plurality of records, the segment including an application or file attribute related to the different executable, comparing the application or file attribute to a vulnerability database, identifying a risk based on the comparison, and generating a report identifying the risk.

In various embodiments, the plurality of records comprises log files associated with different executables. The application or file attributes may comprise, for example, an application or file version, an execution time, or a calling process.

The method may further comprise identifying a type of the at least one of the plurality of records, retrieving record information from a record information database based on the identified type of the at least one of the plurality of records, and identifying a position of the at least one segment within the at least one of the plurality of records, wherein retrieving the at least one segment comprises retrieving the at least one segment from the identified position.

In some embodiments, the method further comprises scheduling when the comparison of the application or file attribute to the vulnerability database is to occur and waiting to compare the application or file attribute to the vulnerability database based on the schedule. In various embodiments, the method further comprises comprising authenticating the plurality of records, wherein the application or file attribute is compared to the vulnerability database only after successful authentication.

Comparing the application or file attribute to a vulnerability database may comprise comparing the application or file attribute to a whitelist. In some embodiments, comparing the application or file attribute to a vulnerability database may comprise comparing the application or file attribute to a blacklist. In various embodiments, comparing the application or file attribute to a vulnerability database may comprise the application or file attribute to a greylist, the greylist comprising application or file attributes associated with suspicious applications or files.

The method may further comprise determining a risk value based on the comparison of the application or file attribute to the greylist and providing an alert based on the risk value. Further, the method may also comprise comprising comparing the risk value to a user threshold wherein providing the alert based on the risk value comprises providing the alert based on the comparison.

An exemplary system comprises a communication module, an information retrieval module, an assessment module, and a report module. The communication module may be configured to receive a plurality of records from a first digital device, each of the plurality of records generated during execution or termination of a different executable and containing information related to execution or termination of the different executable. The information retrieval module may be configured to retrieve at least one segment from at least one of the plurality of records, the at least one segment being less than all of the at least one of the plurality of records, the segment including an application or file attribute related to the different executable. The assessment module may be configured to compare the application or file attribute to a vulnerability database and identify a risk based on the comparison. The report module may be configured to generate a report identifying the risk.

A computer readable medium may comprise executable instructions. The computer readable medium may be non-transitive. The instructions being executable by a processor to perform a method. The method may comprise receiving a plurality of records from a first digital device, each of the plurality of records generated during execution or termination of a different executable and containing information related to execution or termination of the different executable, retrieving at least one segment from at least one of the plurality of records, the at least one segment being less than all of the at least one of the plurality of records, the segment including an application or file attribute related to the different executable, comparing the application or file attribute to a vulnerability database, identifying a risk based on the comparison, and generating a report identifying the risk.

In various embodiments, an agent on a digital device may comprise a monitor module, an application identification module, a vulnerability module, a rules database, and a rule module. The monitor module may be configured to monitor a device for an instruction to execute a legitimate application. The application identification module may be configured to identify one or more attributes of the legitimate application. The vulnerability module may be configured to retrieve risk information based on the one or more attributes of the legitimate application. The risk information may be determined from known vulnerabilities of the legitimate application. The rules database may be for storing a rule associated with the risk information. The rule module may be configured to retrieve the rule from the rule database based on the risk information and to control the legitimate application based on the rule.

In some embodiments, the rule module configured to control the legitimate application based on the rule may comprise blocking the legitimate application from executing based on the rule, allowing the legitimate application to execute based on the rule, or allowing the legitimate application to execute based on the rule but blocking some functionality of the legitimate application from executing based on the rule.

The monitor module configured to monitor the device for an instruction to execute the legitimate application may comprise the monitor module intercepting instructions being provided to or from an operating system of the device. The attribute may be an application identifier. The attribute may be an application version identifier.

In various embodiments, the rule comprises an instruction to block all or part of the execution of the legitimate application if risk information indicates, at least in part, that a vulnerability associated with the legitimate application was publicly disclosed before a predetermined date. The predetermined date may be calculated as occurring at a period of time before a current date or at before any provided date.

In some embodiments, the rule comprises an instruction to block all or part of the execution of the legitimate application if risk information indicates, at least in part, that a public exploit of a vulnerability associated with the legitimate application exists.

In various embodiments, the rule comprises an instruction to block all or part of the execution of the legitimate application if risk information indicates, at least in part, that a vulnerability associated with the legitimate application was identified before a predetermined period of time. The rule may be applicable to multiple different legitimate applications on the device. The rule module may be configured to retrieve a plurality of rules from the rule database, each of the plurality of rules associated with the risk information. The rule module configured to control the legitimate application based on the rule may comprise controlling the legitimate application based on the strictest rule of the plurality of rules.

The risk information may comprise a risk value and the rule comprises instructions regarding control of the application based on the risk value.

An exemplary method may comprise monitoring a device for an instruction to execute a legitimate application, identifying one or more attributes of the legitimate application, retrieving risk information based on the one or more attributes of the legitimate application, the risk information determined from known vulnerabilities of the legitimate application, storing a rule associated with the risk information, retrieving the rule from the rule database based on the risk information, and controlling the legitimate application based on the rule.

An exemplary non-transitory computer readable medium may comprise instructions executable by a processor to perform a method. The exemplary method may comprise monitoring a device for an instruction to execute a legitimate application, identifying one or more attributes of the legitimate application, retrieving risk information based on the one or more attributes of the legitimate application, the risk information determined from known vulnerabilities of the legitimate application, storing a rule associated with the risk information, retrieving the rule from the rule database based on the risk information, and controlling the legitimate application based on the rule.

DETAILED DESCRIPTION OF THE INVENTION

Figure 1:
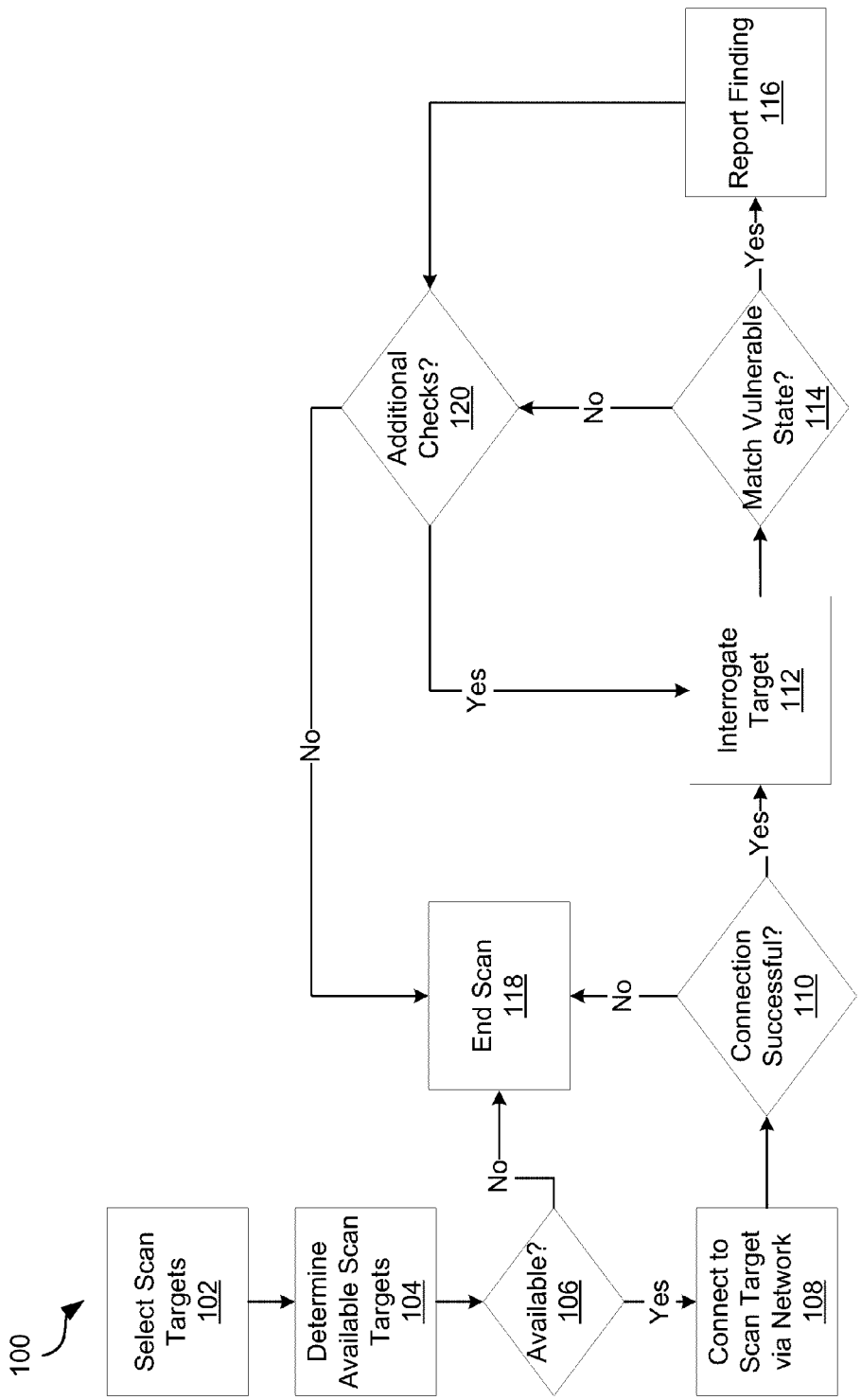
FIG. 1 is a flow chart for active network scanning of targets to match a vulnerability state in the prior art.

FIG. 1 is a flow chart 100 for active network scanning of targets to match a vulnerability state in the prior art. A traditional vulnerability assessment of scan targets will launch an array of tests that audit the configuration or state of target hardware and software. These checks will test for vulnerabilities such as missing patches or insecure configurations. A subset of these tests typically examines software and client applications installed on target machines. By examining the file system, registry and configuration files, the scanner can detect outdated versions of applications (e.g., Internet Explorer, Firefox, Microsoft Outlook, Microsoft Media Player and RealNetworks' RealPlayer). Typically these active tests will examine installed applications to identify:

Application Name
Application Publisher
File Name
File Location/Path
File Version
File Timestamp
File Description
File Checksum (MD5, SHA-1, etc.)
Digital Signature From this information the vulnerability scanner searches a database of known vulnerabilities to see if the installed application is associated with known vulnerabilities. Prescriptive guidance is then provided to the user of the vulnerability scanner.

Flow chart 100 is an exemplary process of network scanning of targets in the prior art. In step 102, a scanning server selects scan targets. A scan target may be any digital device configured to support the scan. In one example, a digital device must have installed scanning software and at least one agent to be responsive to centralized server that may command the scan. A digital device is any device with a processor and memory.

In step 104, the scanning server may determine available scan targets. The scanning server typically requires scheduling of network scans. Scanning generally occurs when the target digital device is unused because the scanning may reduce the digital device's performance. Unfortunately, when many digital devices are unused, they may be shut down (i.e., unavailable to the network) a result of which is that the unconnected and/or unpowered digital device is not capable of being scanning.

In step 106, the scanning server determines the availability of a target digital device. If the target digital device is on the network and has resources for scanning (e.g., the target digital device is available at 3:00 AM in the morning and/or has not been used by a user for a predetermined period of time), the scanning server may connect to the scan target (e.g., the target digital device) via the network in step 108. If the target digital device is not available, the process may end in step 118 or be reschedule for another time whereby the scanning server must, once again, determine if the target digital device is available (see step 106).

If the scanning server connects to the target digital device successfully in step 110, the scanning server may directly scan the target digital device or may trigger a self scan of the target digital device in step 112 (i.e., interrogate target). If the connection is not successful, the process may end in step 118 and the scan rescheduled.

During scanning, applications, files and registries may be directly examined to identify applications and files. The information is retrieved and compared against a database of known vulnerabilities. If a match of a vulnerable state is determined in step 114, the scanning server or the target digital device may report the finding in step 116. If a match is not found or a report is generated, the scanning server may determine whether additional checks are necessary in step 120. If additional checks are necessary, the process rescans or performs additional scans (if the target digital device is available) in step 112. If additional checks are not necessary, the process ends in step 118.

Figure 2:
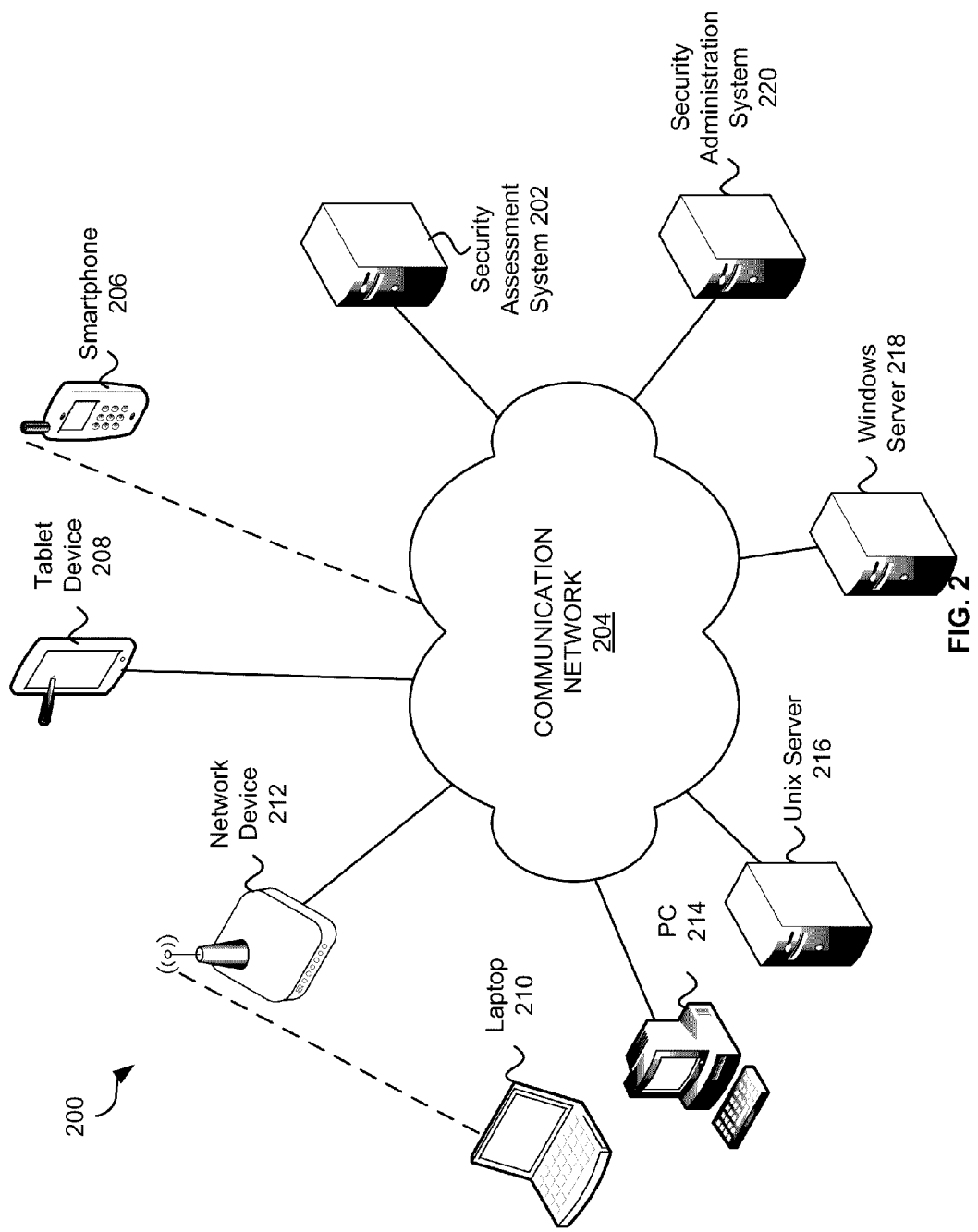
FIG. 2 is a block diagram of an exemplary environment in some embodiments.

FIG. 2 is a block diagram of an exemplary environment 200 in some embodiments. In various embodiments, different digital devices are in communication with a security assessment system 202 over a communication network 204. As discussed herein, a digital device is any device with a processor and memory. Digital devices are further described regarding FIG. 9 herein. In various embodiments, different digital devices (e.g., smartphone 205, table device 208, laptop 210, network device 212, PC 214, Unix server 216, and windows server 218) may generate records (e.g., logs or other information) regarding execution or termination of one or more instances of one or more applications or files. Many third party applications may generate records (e.g., logs) for a variety of purposes. The records may be generated during execution or termination of one or more instances of one or more executables. In one example, a record may be generated during execution or termination of an executable instance. The executable may be unrelated to scanning and/or security. The record may be created to track performance of the executable, system calls, a version of the executable, or the like. The instance of the executable may not initiate the creation of the record and the initiation and creation of the record may be unrelated to the function(s) of the executable instance.

A security assessment system 202 may configured to receive records (including records of one or more third-party applications), retrieve relevant information from within the records, and identify potential vulnerabilities without the need to actively scan each device. In various embodiments, vulnerabilities of different digital devices may be detected without scheduling active vulnerability scans as described in the prior art which may reduce performance of the digital device being scanned and require end user cooperation (e.g., to keep the digital device powered during scan, connecting the digital device to a network for the scan, and/or not interrupting the scan).

In various embodiments, records may be generated by any number of applications on the digital device at any time. Similarly, the records may be provided to the security assessment system 202 at any time. The security assessment system 202 may retrieve relevant information from the records and compare the retrieved information to a vulnerability data structure such as a whitelist, blacklist, greylist, and/or other information to detect vulnerabilities. In some embodiments, a whitelist is a data structure of identifiers of known good application and files, a blacklist is a data structure of identifiers of known vulnerable applications and files, and a greylist is a data structure of identifiers of applications and files that are suspicious. In various embodiments, the security assessment system 202 may detect vulnerabilities at any time as opposed to only those date and times where the digital device is available for a scheduled system-wide scan. Further, the security assessment system 202 may detect vulnerabilities without requiring availability of digital devices at scheduled times and may be less disruptive to performance activities of the digital device because the digital device may not be scanned for applications and files as described in the prior art.

In some embodiments, periodically providing one or more records of a digital device to the security assessment system 202 may lead to detection and identification of vulnerabilities before traditional scanning of network targets can be scheduled and conducted. For example, a limitation of a security assessment system 202 may be the availability of resources to examine records for vulnerabilities. The security assessment system 202, however, may comprise cloud computing and/or any number of digital devices that may potentially detect and/or identify vulnerabilities at any time. Traditional scanning systems, however, may be limited based on availability of the digital device to be scanned when the scan is scheduled, resource utilization on the digital device during scanning, network connectivity for the duration of the scan, network congestion, and server resources. Due to these and other limitations as well as the practicality of network scanning of digital devices, the network scans as discussed in the prior art are periodically scheduled (e.g., once a week). As a result, in the prior art, vulnerabilities may only be detected on that time frame. Those skilled in the art will appreciate that many vulnerabilities may be exploited and networks damaged between network scans whereas security assessment of records by a security assessment system 202 may detect and/or identify vulnerabilities comparatively quickly.

The environment of FIG. 200 comprises a security assessment system 202, a smartphone 206, a tablet device 208, a network device 212, a laptop 210, a PC 214, a UNIX server 216, a windows server 218, and a security administration system 220 in communication over a communication network 204. Records, such as logs, may be generated by one or more of the smartphone 206, the tablet device 208, the network device 212, the laptop 210, the PC 214, the Unix server 216, the windows server 218 to the security assessment system 202. In one example, the records or logs may be generated to allow review of resource utilization, process calls, and activities of an application instance. The records or logs may be generated by any application or agent on the digital devices.

The security assessment system 202 may retrieve relevant information from the records and utilize the relevant information to detect and/or identify vulnerabilities. The security assessment system 202 may, in various embodiments, generate reports and/or alerts based on the detected and/or identified vulnerabilities.

The records may contain information regarding an instance of an application, including configuration, process calls, exception handling, execution time, calling processes, names of files needed for execution, file types, file versions, application types, application versions, and/or the like. Records may also be generated to summarize or track information, such as one or more processes associated with an instance of an application or executable.

In one example, a digital device may generate different logs, each of the logs being associated with an instance of a one or more applications being executed by the digital device. Those skilled in the art will appreciate that records, such as logs, are often generated in many different devices for many application instances for purposes that are unrelated to security (e.g., unrelated to detection and identification of vulnerabilities). For example, the primary purpose of one or more of the logs may be to allow review of configurations, process efficiency, performance, backup, and/or error handling of application instances. Some records or logs may remain on the digital device (e.g., permanently or temporarily stored) unless needed. One or more other applications on the digital device may be configured to provide the logs to one or more different third parties associated with application instance (e.g., the software publisher) or a network administrator.

In various embodiments, copies of one or more records may be provided to the security assessment system 202 for assessment. The one or more records may be generated at any time by applications that may not be security related and the records may be not generated for a security related purpose. In some embodiments, one or more records of a plurality of records provided to the security assessment system 202 may be generated by a security application and/or for security related purposes. In some embodiments, a security information and event management system (SIEM) may collect, consolidate, and provide logs to a server.

The security assessment system 202 may receive one or more records from any number of digital devices coupled to the communication network 204 at any time. Similarly, the security assessment system 202 may assess the records at the time received or based on availability of resources of the security assessment system 202 to perform the assessment on the all or a portion of the one or more records. The security assessment system 202 may generate reports and/or alerts as needed.

In one example, when the laptop 210 first installs a vulnerable program (e.g., a browser), a record may be generated of the installation process (e.g., a record is generated to log the installation process during the instance of the installation application). The record may be provided to the security assessment system 202 which may retrieve version information of the installed program (i.e., relevant information) from the record and compares the version information of the installed program against a blacklist (i.e., a list of known vulnerabilities). The security assessment system 202 may generate an alert or a report identifying the vulnerability and provide the alert and/or report to the user of the laptop 210 and/or the security administration system 220. In this example, the vulnerable browser need not be executed to determine the vulnerability. Further, a system administrator or user of the laptop 210 need not wait until a scheduled network scan (as described in the prior art) before the vulnerable program is identified.

Those skilled in the art will appreciate that user devices, servers, network devices, or any device may provide records to be assessed by the security assessment system 202. User digital devices include, for example, the smartphone 206, the tablet device 208, the laptop 210, and the PC 214. The smartphone 206 may be any phone (e.g., digital phone or cell phone) capable of network communication. The table device 208 may comprise any media device such as an e-reader, tablet, media player, or the like, capable of network communication. The laptop 210 is any computer or mobile device (e.g., ultrabook, netbook, notebook, laptop, or the like) capable of network communication. Various embodiments may include any consumer electronic device, either for the business user or home user) that may communicate over a network and provide records.

The network device 212 may be any device configured for network management or control. Examples of network devices include, but are not limited to, routers, bridges, network appliances, hotspots, access points, firewalls, or the like. Those skilled in the art will appreciate that a network device 212 may generate records or other information that may be provided to the security assessment system 202 for assessment of vulnerabilities in the network device 212 or assessment of vulnerabilities by devices that utilize the network device 212 (e.g., laptop 210).

The Unix server 216 and windows server 218 are exemplary. There may be any number of servers, regardless of operating or file system, configured to support one or more networks such as the communication network 204.

The security assessment system 202 may comprise any number of digital devices configured to receive records from one or more other digital devices over the communication network 204, retrieve relevant information from at least some of the received records, assess the retrieved information, and identify one or more vulnerabilities based on the assessment. The security assessment system 202 may be cloud-based. In some embodiments, the security assessment system 202 comprises one or more network and/or security appliances. One example of a security appliance is the PowerKeeper. Security appliances are further discussed in U.S. Nonprovisional application Ser. No. 12/571,231, filed Sep. 30, 2009, and entitled "Systems and Methods for Automatic Discovery of Systems and Accounts" which is incorporated by reference herein.

The security administration system 220 may comprise any number of digital devices configured for administration of the communication network 204. In some embodiments, the security assessment system 202 provides alerts and/or reports to the security administration system 220 regarding safety, risk, identified vulnerabilities and/or suspected vulnerabilities. The security administration system 220, in some nonlimiting examples, may control network or system rights to disable applications or files considered to be vulnerable, alter user rights, modify network rights to different digital devices, modify network rights of one or more applications, initiate network scanning of a digital device, command removal of applications or files considered to be vulnerable, command update of applications or files considered to be vulnerable, install patches over the network, upload software over the network, and/or provide security alerts based on the information from the security assessment system 202. In various embodiments, the security administration system 220 comprises a security appliance. The security assessment system 202 and security administration system 220 may be the same system or the same digital device.

Communication network 204 may be any network or combination of networks that allows digital devices to communicate. The communication network 204 may comprise the Internet, one or more LANs, and/or one or more WANs. The communication network 204 may support wireless and/or wired communication.

Although different digital devices are depicted in FIG. 2, the figure is not intended to be exhaustive. There may be any number of digital devices of any type. For example, some embodiments may be practiced on a network comprising all PCs or devices not including phones 206 or table devices 208.

Various embodiments fuse vulnerability and identity management (VIM). While the industry in the prior art has spent over a decade refining the process of vulnerability identification using standards such as OVAL and CVE, some embodiments herein address risk that users face when working with potentially vulnerable applications.

Consider the example of a recent Zero Day vulnerability, "Internet Explorer CButton Use-After-Free Vulnerability," that was released just before the 2013 New Year. The description of the vulnerability is as follows:

A use-after-free vulnerability exists in Internet Explorer 6, 7, and 8. This has been seen exploited in the wild in December 2012 in targeted attacks. Successful exploitation allows the attacker to execute arbitrary remote code in the context of the current user.

This vulnerability is only a risk to the current user based on the permissions they are logged in with (i.e., the user's current network rights) or credentials used to execute Internet Explorer.

Threats like this are easily identifiable with traditional vulnerability management. Traditional vulnerability management, however, fails to consider the permissions of the user if this vulnerability was to be exploited. As an example, consider a system that is vulnerable to this attack. Users that log in to the system with "standard user" permissions are less at risk than a user that logs in with "administrator" privileges since an exploit executes in the context of the current the user. This is the difference between system-wide control to do anything malicious versus restricted permissions based on standard user rights that can generally only operate in the confines of the current user's login.

The next logical question assumes that, if everyone is logging into their systems as standard users, is the zero day risk as great of a threat compared to users that login as administrators? The answer is no. A standard user is less of a risk. Therefore, a potential exclusion or mitigation for the vulnerability report is based on the context of the users executing Internet Explorer within your environment. But what if no one uses Internet Explorer, and you have standardized on another browser like FireFox or Chrome? Yes, the system is technically vulnerable but the offending application is not used and therefore a lower risk even if the user logs in as an administrator. Finally to understand the true meaning of this risk, this vulnerability has been observed in the wild exploiting targets. Users running as administrators are highly susceptible to drive by attacks versus the standard user. A traditional vulnerability report does not know the difference.

In some embodiments, the security assessment system 202 may receive records from a digital device, identify a vulnerability associated with the digital device, and determine the network rights of the user of the digital device at the time the vulnerability was identified and/or a vulnerable application or file was accessed. The security assessment system 202 may generate an alert or other indication if a user with administrator or other elevated network rights utilized a known vulnerable application and/or file. As discussed herein, application exploits may be limited by the network rights of the individual user at the time of the exploit. If the user has limited rights (e.g., "guest" rights), an exploit of a vulnerability may be limited to only the single digital device and/or specific software on the digital device. If, however, the user has greater network rights, other digital devices on the network may be configured to trust the user's device based on the user's network rights. As a result, an application exploit may allow malware to influence or control other digital devices on the same network or software on another digital device (e.g., a server) on the same network.

It is appreciated that traditional network scanning does not account for user rights. For example, in the prior art, a network scan of a digital device may detect and identify vulnerabilities of each scanned application or file, however, a traditional network scan does not detect the rights of users when the application or file is utilized. In fact, the traditional network scan does not determine if an application with a known vulnerability has ever been used, much less determine the rights of a user at the time a vulnerable application is utilized. It is further appreciated by those skilled in the art that a user may have several different accounts and/or different network rights. As a result, it cannot be assumed that every user will always have the same rights every time an application or file is accessed.

The security assessment system 202 and/or the security administration system 220 may track user rights over time thereby allowing determination of the user and the user rights at the time a record indicates a vulnerable program was installed, accessed, called, or utilized.

Figure 3:
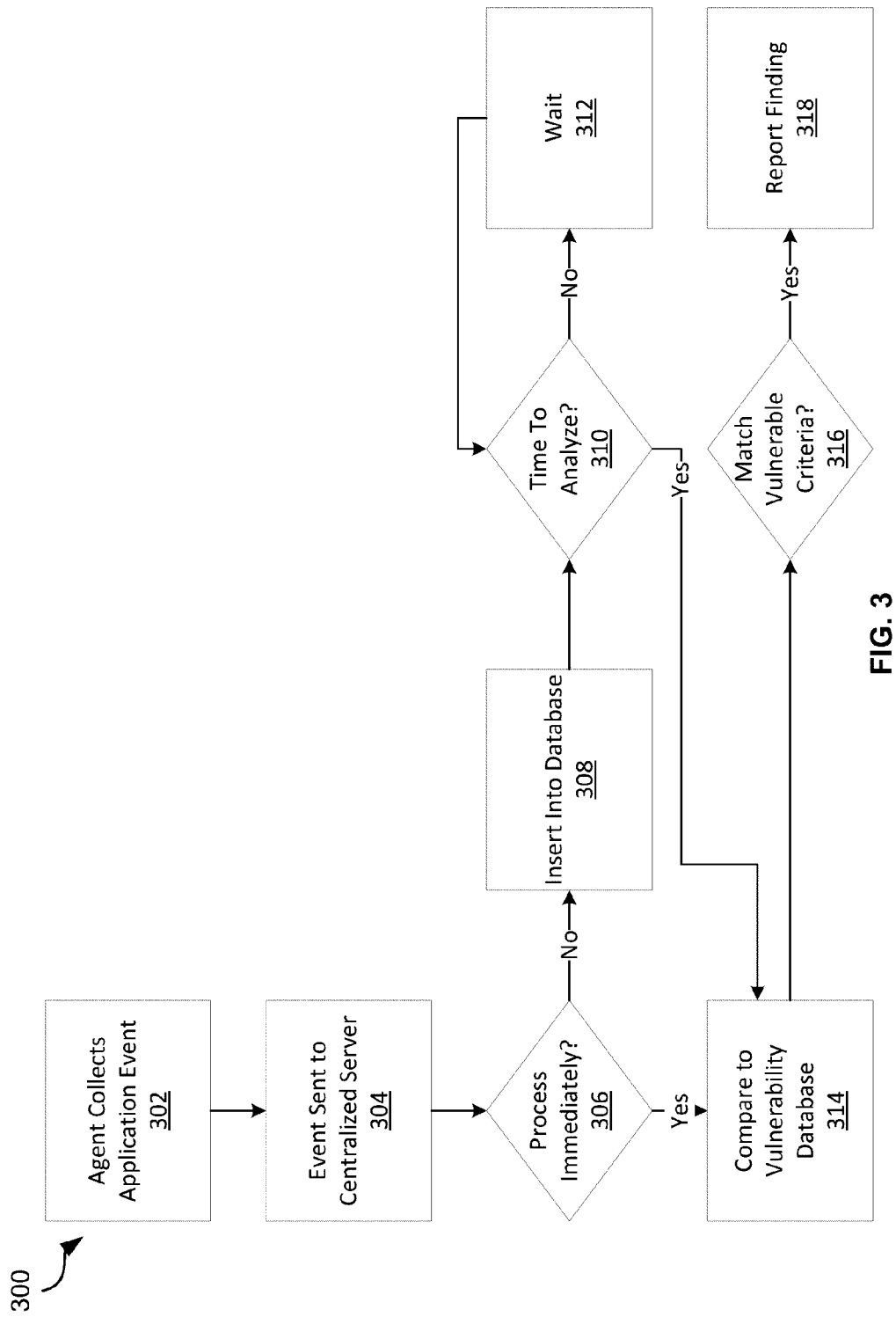
FIG. 3 is a flow chart for collection of information describing application events on a user device and comparing different portions of the collection against a vulnerability database in some embodiments.

FIG. 3 is a flow chart 300 for collection of information describing events (e.g., system, application, and file calls) on a digital device and comparing different portions of the collection against a vulnerability database in some embodiments.

Some embodiments described herein address vulnerability assessment of installed applications by examining records (e.g., an event stream) provided by third party transmitters installed on scan targets (e.g., applications and/or files). With this approach, a scanning server need not communicate directly with scan targets. As a result, there may not be a need for network-based examination of installed applications against a known vulnerability database as described in the prior art.

Various embodiments described herein may leverage data provided by existing agents installed on digital devices. Examples of these agents include, but are not limited to:
File Monitoring
Application Whitelisting
General System Monitoring
Software Inventory
Asset Management
Any Software that Captures Application Level Information Each of these agents may generate one or more records. Once captured, this information may be passed as an event stream or series of records to a centralized server (i.e., the security assessment system 202—see FIG. 2). Methods of transmission include, but are not limited to:
Syslog
SNMP
Web Services
HTTP/S
SSL
Windows Event Logs The security assessment system 202 may parse the event stream or records for relevant application and file attributes which may include:
Application Name
Application Publisher
File Name
File Location/Path
File Version
File Timestamp
File Description
File Checksum (MD5, SHA-1, etc.)
Digital Signature
Execution Time
Calling Process Once received, the security assessment system 202 may examine the application and file attributes either in real time (as the data arrives) or post processing (examines existing data). The received data may be compared to a list of existing vulnerabilities, and findings may be reported as applicable.

Various embodiments allow organizations currently performing process, application and transaction monitoring to centrally integrate with a virtual vulnerability scanning system (i.e., vulnerability scanning without network scanning as described in the prior art) to provide useful information. Types of information include, but are not limited to:
  Indication of which applications are being run within the environment that have known vulnerabilities that can put the organization at risk;
  Identification of the most frequently run vulnerable applications to help prioritize remediation of these applications through path deployment or other means; and
  Identification of when critical servers or sensitive accounts are utilizing vulnerable applications to help prioritize remediation of these applications through path deployment or other means.

Some embodiments present an entirely new way of examining network devices for vulnerabilities—one that may leverage data from existing agents to eliminate the need for an active vulnerability scan as described in the prior art. This method may allow organizations to efficiently determine risk and exposure.

Flowchart 300 is a high level description of an exemplary process in some embodiments. In step 302, an agent on a digital device collects application events. In one example, the agent collects records (e.g., logs) or other information that is generated during execution or termination of an instance of an application.

In step 304, the agent may provide the records to a centralized server (e.g., security assessment system 202). In some embodiments, the agent may provide record information to describe the records (e.g., record type, application that generated the record, record format, or the like). There may be any number of records. In various embodiments, the records are consolidated and record information is sent to identify the location of each record within the consolidated records as well as any other information assist in retrieving relevant information that may be used for assessing the records for vulnerabilities.

In step 306, the centralized server (e.g., security assessment system 202) determines whether the records received from the agent may be processed (e.g., assessed). In various embodiments, the security assessment system 202 may schedule a time to assess the records based on time, the identity of the digital device that provided the records, availability of resources, pipelining, or any other reason. If the security assessment system 202 determines that the assessment cannot occur immediately, the security assessment system 202 may store the records and/or record information within a database in step 308. The security assessment system 202 may check resources or any other limitation to determine if the records may be assessed in step 310. If the scheduled time has not arrived or resources are not available, the process may wait in step 312.

If the assessment can happen immediately or if resources are available, the security assessment system 202 may compare segments or portions of records (e.g., relevant information of the record) against a vulnerability database in step 314. The vulnerability database may comprise, for example, whitelists and blacklists which are further described herein.

Those skilled in the art will appreciate that the agent may send a variety of different kinds of records or logs containing different information in different locations. Many of the records or logs may be created for different purposes and, as such, not all information is relevant to security assessment. As such, record information may be received from an agent that identifies the types, names, or any other information that may identify the one or more of the records provided from the agent. In some embodiments, the security assessment system 202 scans one or more records to identify the type, name, or other information that may identify one or more records.

Once a record is identified, locations of relevant information or segments of records containing relevant information may be identified. In various embodiments, the security assessment system 202 retrieves rules or filters that identify locations or segments of records based on record information provided by the agent and/or type, name or other information that may identify one or more records. In some embodiments, the security assessment system 202 scans one or more records to identify relevant information without utilizing rules or filters.

In various embodiments, the security assessment system 202 may compare the segments of the records to all or portions of the vulnerability databases 314 to assess vulnerabilities.

In step 316, if there is match between one or more segments of the records and the vulnerability database which indicates a vulnerability, the security assessment system 202 may report the finding in step 318.

Figure 4:
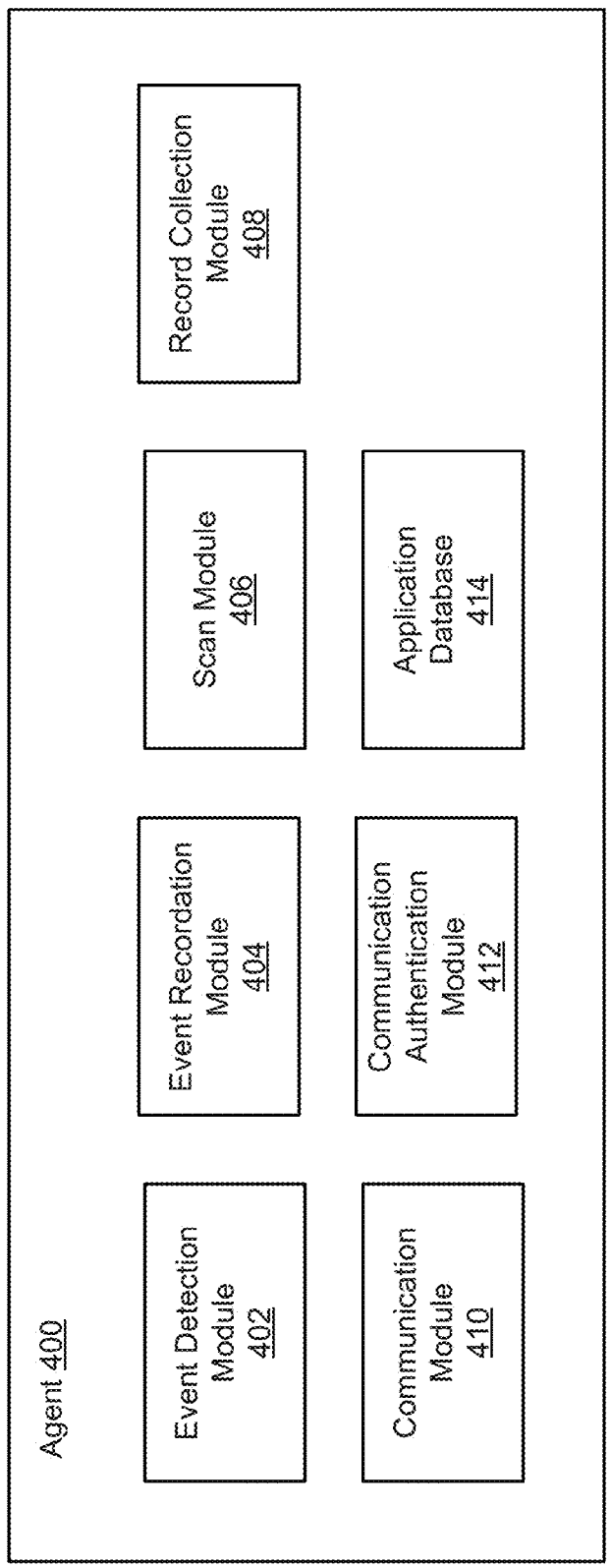
FIG. 4 is a block diagram of a user device agent in some embodiments.

FIG. 4 is a block diagram of a user device agent 400 in some embodiments. An agent is optional. In some embodiments, a digital device comprises different applications and executables that generate different records, such as logs. The records may contain information regarding an instance of an application, including configuration, process calls, exception handling, execution time, calling processes, names of files needed for execution, file types, file versions, application types, application versions, and/or the like. Records may also be generated to summarize or track information, such as one or more processes associated with an instance of an application or executable. Records are further described herein.

In various embodiments, one or more different applications and/or executables (e.g., Security Information & Event Management (SIEM)) may be directed to provide a copy of one or more records to the security assessment system 202 (see FIG. 2). In one example, a digital device may generate different logs, each of the logs being associated with an instance of a different application being executed by the digital device. The purpose of one or more of the logs may be to allow review configuration, process efficiency, performance, backup, and/or error handling of the application instance. One or more other applications on the digital device may be configured to provide the logs to one or more different third parties associated with application instance (e.g., the software publisher) or a network administrator. Applications configured to periodically send the logs to different network destinations may be further configured to provide an additional copy to the security assessment system 202. In this example, there may be no agent on the digital device or an agent is used only to reconfigure applications (e.g., reconfigure a Security Information & Event Management (SIEM) program) to send the additional copy to the security assessment system 202.

In some embodiments, an agent 400 installed on the user digital device may be configured to provide copies of logs or other records generated by other applications to the security assessment system 202 and/or generate records of application instances. In various embodiments, the agent 400 collects (or identifies the location of) records or other logs generated by other applications and provides copies of records or other logs to the security assessment system 202. The agent 400 may, in some embodiments, detect and record one or more events associated with application instances to collect information for the security assessment system 202.

Those skilled in the art will appreciate that the agent 400 may generate its own record, collect records generated by other applications, and provide the records to the security assessment server. In other embodiments, the agent 400 may provide copies of records or other logs created by other applications to the security assessment system 202 or provide copies of records generated by the agent 400 to the security assessment system 202.

Agent 400 is an exemplary agent configured to record events associated with application instances, identify records generated by other applications, provide copies of records (e.g., both the agent-generated records as well as the records generated by other applications) to the security assessment system 202.

Agent 400 comprises an event detection module 402, an event recordation module 404, a scan module 406, a record collection module 408, a communication module 410, a communication authentication module 412, and an application database 414. As discussed herein, the event detection module 402 and the event recordation module 404 may be optional. In various embodiments, the event detection module 402 may detect events on the host digital device. An event or record may comprise the execution of an executable and/or one or more actions of the executable instance. Records are further described herein. In one example, the event detection module 402 is a part of the operating system and/or is in memory (e.g., ram) of the digital device. The event detection module 402 may detect aspects of interest during events (e.g., an instance of an executable calls another application or file). The event detection module 402 may detect all or some actions of a digital device caused by a user, an operating system, or an executable.

The event recordation module 404 may generate records of events or select aspects of events (e.g., application or file attributes) detected by the event detection module 402. In various embodiments, the event detection module 402 detects processes and/or actions of instances of executables including information regarding an application initiating the executable instance, call process, access requests, files accessed, applications engaged, and/or the like. In some embodiments, the event recordation module 404 generates an event stream that includes all, some, or one of the following application or file attributes:

Application Name
Application Publisher
File Name
File Location/Path
File Version
File Timestamp
File Description
File Checksum (MD5, SHA-1, etc.)
Digital Signature
Execution Time
Calling Process The event recordation module 404 may generate any number of event streams regarding any number of executable instances. In one example, the event recordation module 404 records a different record (e.g., all or part of an event stream) for one or more different instance. In another example, one or more event streams may be recorded for any number of executed instances.

The scan module 406 may scan a digital device for records and/or applications that generate records. For example, the scan module 406 may scan for applications that typically create log files. In some embodiments, the scan module 406 scans all or some of the storage (e.g., hard disk, SSD, and/or flash) of a digital device for applications. The scan module 406 may retrieve a record data structure from the application database 414 and compare the scan results to the record data structure to identify applications that generate logs as well as the locations of the logs. The scan module 406 may maintain a table or other data structure which includes the locations and types of records of a digital device. The scan module 406 may also scan for directly for records (e.g., logs).

Those skilled in the art will appreciate that the scan module 406 may periodically update or otherwise maintain a table or other data structure which includes locations and/or types of records of a digital device. In one example, the scan module 406 may scan new software installations or software removals to add or remove locations of expected records.

The record collection module 408 may be configured to collect records from the event recordation module 404 and/or records identified by the data structure that includes the locations and types of other records of a digital device to provide copies to the security assessment system 202 (see FIG. 2). In various embodiments, the record collection module 408 copies records rather than move, delete, or alter the records. In some embodiments, the record collection module 408 collects records generated by the event recordation module 404. In other embodiments, the record collection module 408 collects at least some of the records identified by the data structure which includes the locations and types of records of the digital device. In various embodiments, the record collection module 408 collects records generated by the event recordation module 404 as well as at least some of the records identified by the data structure which includes the locations and types of records of the digital device.

In various embodiments, the record collection module 408 generates record information regarding the collected records. The record information may describe the types of records collected. In one example, the record information may identify a record generated by the event recordation module 404. The record information may also identify the records generated by other applications including the number of records, types of records, the applications that generated the records, the application instances associated with the records, or the like.

In some embodiments, the collection of records may be consolidated and/or encoded. The record information may indicate whether the records have been consolidated, encoding methodology of all, some, or one of the records, record locations (e.g., start and end points of records in text fields), or the like.

In various embodiments, the record collection module 408 collects records based on a schedule or based on the presence of one or more records to provide to the security assessment system 202. In one example, the record collection module 408 collects records at predetermined dates and/or times. In another example, the record collection module 408 may track the number of records generated by the event recordation module 404 and/or other applications. In this example, if the number of generated records is greater than a predetermined threshold (e.g., greater than 1 or greater than 3), the record collection module 408 may collect and provide records to the security assessment system 202. The threshold may be set by the user, a system administrator, the agent 400, the security assessment system 202, the security administration system 220, or any other user or device with sufficient rights.

A communication module 410 provides the collected records and record information to the security assessment system 202. In various embodiments, the communication module 410 generates an assessment request that identifies the digital device and includes the collected records from the record collection module 408. The assessment request may additionally include the record information from the record collection module 408. The communication module 410 may provide the assessment request and/or record information to the security assessment system 202 at any time (e.g., at scheduled times, upon command by a user, upon command by the security assessment system 202, upon command by the security administration system 220, upon command by a network administrator, or when records are received from the record collection module 408 to be provided to the security assessment system 202).

The communication module 410 may provide the records as a stream of events or discrete messages to the security assessment system 202 (see FIG. 2) in any manner. In some nonlimiting examples, the communication module 410 may provide the information to the security assessment system 202 in the following manner:

Syslog
SNMP
Web Services
HTTP/S
SSL
Windows Event Logs

The optional communication authentication module 412 may digitally sign or provide authentication information to the assessment request and/or the record information. In various embodiments, the security assessment system 202 and/or the system administration system 204 may authenticate, verify, and/or authorize assessment of the records provided by the digital device based on a digital signature or other authentication information. For example, each agent 400 or digital device may digitally sign the assessment request and/or record information with one or more encryption keys. The security assessment system 202 or other device may decrypt the signature for security (e.g., confirm authenticity and/or accuracy of the assessment request and/or record information). In some embodiments, one or more encryption keys are provided and assigned to a digital device upon installation or registration of the agent 400. One or more encryption keys may be provided, assigned, and/or updated at any time and in any manner.

A module is any hardware, software, or combination of both hardware and software. Those skilled in the art will appreciate that the modules identified in FIG. 4 may perform more or less functionality as described herein. For example, some modules may perform the functions of other modules. Further, functions shown with respect to FIG. 4 are not limited to a single digital device but may be performed by multiple digital devices performing different functions. In some embodiments, multiple digital devices perform functions simultaneously.

Figure 5:
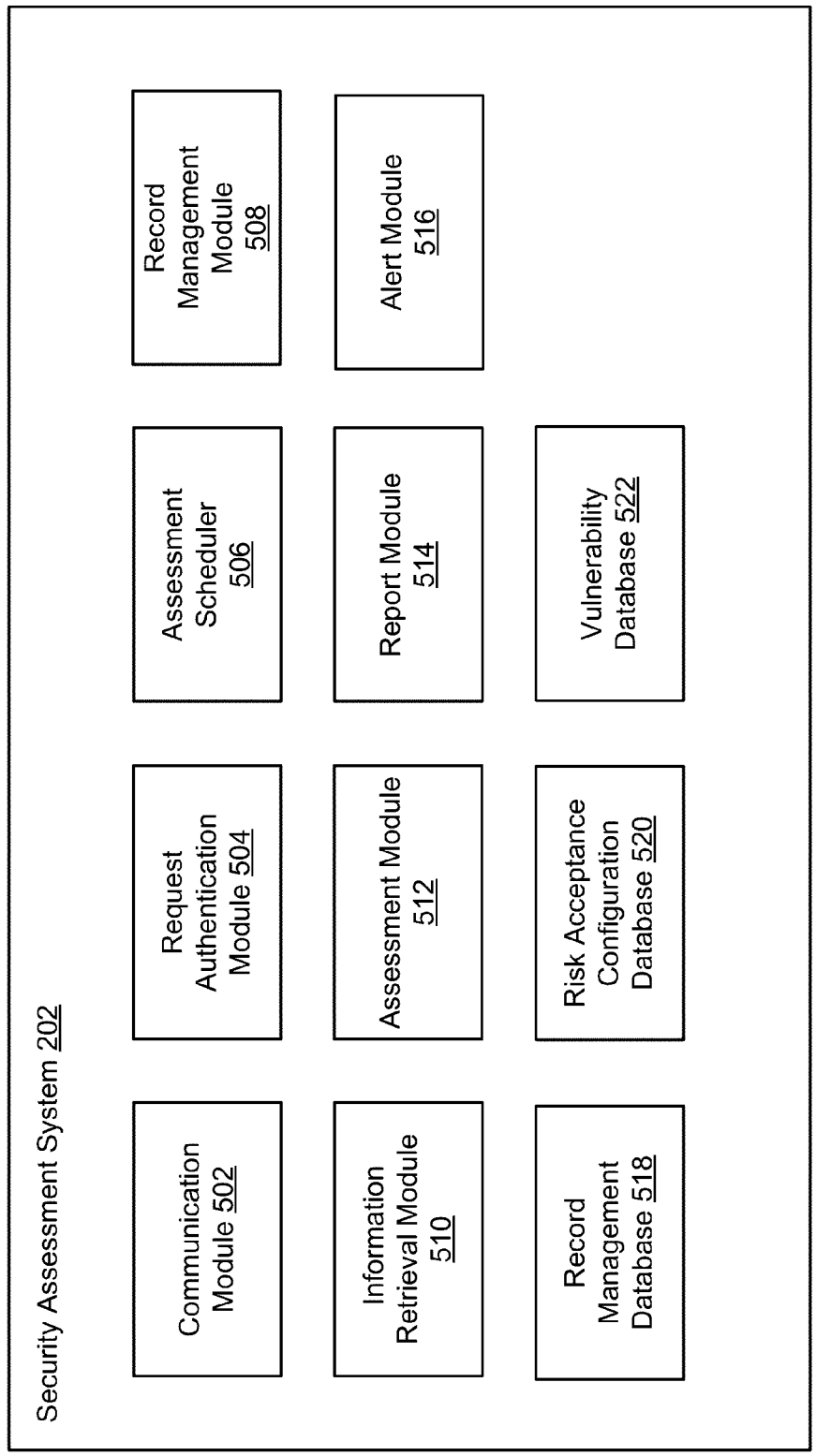
FIG. 5 is a block diagram of a security assessment server in some embodiments.

FIG. 5 is a block diagram of a security assessment system 202 in some embodiments. An exemplary security assessment system 202 comprises an agent communication module 502, an agent authentication module 504, an assessment scheduler 506, a record management module 508, an information retrieval module 510, an assessment module 512, a report module 514, an alert module 516, a record management database 518, a risk acceptance configuration database 520, and a vulnerability database 522.

The communication module 502 is configured to receive an assessment request and, optionally, record information regarding the assessment request from one or more digital devices over a communication network 204 (see FIG. 2). As discussed herein, the assessment request may comprise one or more records from a digital device. The record information may describe the record(s) of the assessment request (e.g., type of records and location of each record). In some embodiments, the communication module 502 may identify the providing digital device, the time of transmission, and (if an agent is installed on the digital device) potentially an agent version. The record information may be optional. In some embodiments, the communication module 502 or record management module 508 (further described herein) may scan one or more records of the assessment request to retrieve information regarding the type of record, location of each record, and/or identify relevant information.

The optional request authentication module 504 is configured to authenticate the assessment request and/or record information. As discussed herein, the assessment request and/or record information may be digitally signed or encrypted. The request authentication module 504 may be configured to authenticate, verify, and/or authorize the assessment request and/or record information. In one example, the request authentication module 504 may identify the digital device, the agent that provided the assessment request, or any other information to retrieve one or more appropriate encryption keys (e.g., a private or public encryption key) with which to decrypt the assessment request and/or record information. In some embodiments, the request authentication module 504 authenticates the assessment request based on a digital signature. Those skilled in the art will appreciate that the assessment request may be authenticated in any number of ways.

The optional assessment scheduler 506 is configured to schedule security assessments in some embodiments. In various embodiments, the assessment scheduler 506 schedules security assessments based on availability of resources (e.g., processor availability) of one or more digital devices that are part of the security assessment system 202. In some embodiments, the assessment scheduler 506 may buffer or store the assessment request and/or record information until scheduled. The assessment scheduler 506 may, in some embodiments, allow assessments to be conducted as assessment requests are received if there assessment scheduler 506 determines that the security assessment system 202 has available resources to performs the tasks.

The assessment scheduler 506 may give priority to different digital devices based on the device's importance (e.g., the device performs critical functions), urgency, or trust of the device by others on the network. For example, a central server or the network administrator may be assessed before others or the security assessment system 202 may interrupt the assessment of other digital devices. In one example, assessment of a critical digital device's records may interrupt the assessment of other records belonging to other digital device due to the risk that an exploit of a trusted critical machine may interrupt critical tasks, potentially compromise network security, and/or potentially compromise security of the security of other devices on the network.

The record management module 508 is configured to identify the records of the assessment request. In various embodiments, an assessment request may comprise a different number of records as well as different types of records from other assessment requests. In one example, the same digital device may provide multiple assessment requests, each containing a different number of records as well as records of different types (e.g., the digital device may provide assessment requests periodically or when a certain number of records are available to be provided).

The record management module 508 may identify the number and type of records by utilizing record information provided by the sending digital device. As discussed herein, the record information may identify the name of records, record type, sending digital device, and other information. If the record is consolidated (e.g., combined into one stream or file), the record information may indicate the beginning and end points for each different record. Alternately or additionally, the record management module 508 may identify similar information by scanning one or more of the records. In some embodiments, the record management module 508 scans the records to identify application or file attributes that are relevant to the assessment without identifying record information.

Once the records of the assessment request are identified, the information retrieval module 510 may optionally retrieve rules or filters to allow the security assessment system 202 to retrieve relevant information from any number of the records of the assessment request. In one example, the information retrieval module may retrieve rules or filters from the record management database 518. The information retrieval module 510 may retrieve rules or filters based on information provided by the record management module 508 (e.g., based on the record information and/or scanning of the records of the assessment request). In one example, the information retrieval module 510 may receive the types and/or names of records contained in the assessment request from the record management module 508. Based on the types and/or names of the records, the information retrieval module 510 may retrieve rules and/or filters for each type and/or name of the records.

The rules and/or filters may allow the information retrieval module 510 to identify one or more segments (e.g., locations) within each record as containing relevant information. Further, in some embodiments, the rules and/or filters allow the information retrieval module 510 to identify the type, name, and/or nature of the information of one or more of the identified segments. For example, a location in a specific record type may contain an application version number. Another location of the same specific record type may contain an identifier of a specific process. In some embodiments, one or more records may be encoded. The information retrieval module 510 may decode one or more records based on the retrieved rules and/or filters. In one example, the information retrieval module 510 may identify the following nonlimiting exemplary types of information (e.g., application or file attributes):

Application Name
Application Publisher
File Name
File Location/Path
File Version
File Timestamp
File Description
File Checksum (MD5, SHA-1, etc.)
Digital Signature
Execution Time
Calling Process Those skilled in the art will appreciate that any other kind, type, or name of information may be utilized to assess security by the assessment module 513.

The assessment module 512 may assess the information in the records located by the information retrieval module 510. In some embodiments, the assessment module 512 may compare one or more segments of one or more records of the assessment request to all or part of a vulnerability database 522 to determine and/or identify vulnerabilities. In some embodiments, the assessment module 512 compares a segment of a record (i.e., at least a portion of the relevant information contained within at least one record) to a portion of the vulnerability database 522 based on the type of record, the type of information contained within a segment of the records, the name of information contained within a segment of the records, or any other information. For example, if the information retrieval module 510 identifies a segment and indicates that the segment comprises a file checksum, the assessment module 512 may compare the segment to the portion of the vulnerability database 522 containing file checksums.

The assessment module 512 may compare segments or any information contained within any of the records to all or part of the vulnerability database 522. In some embodiments, the vulnerability database 522 includes known good application and files (e.g., a whitelist), known vulnerable applications and files (e.g., a blacklist), and/or those applications and files that are suspicious (e.g., a greylist). In one example of a whitelist, the assessment module 512 may compare any number of segments from any number of records of any number of assessment requests to confirm and/or verify that the digital device has one or more trusted (e.g., nonvulnerable) applications or files. In some embodiments, a network administrator or other security professional may require that all applications and files be identified and/or confirmed by the whitelist.

In another example, the assessment module 512 may compare segments or any information contained within any of the records to a blacklist of known vulnerable applications and files. In a further example, the assessment module 512 may compare segments or any information contained within any of the records to a greylist. The greylist may contain all applications and files that are unknown, or, alternately, only those applications or files that are suspicious. In some embodiments, the greylist may indicate a degree of suspiciousness that may be evaluated to determine a risk value (e.g., a degree or indication of risk).

In some embodiments, the assessment module 512 may compare segments or any information contained within any of the records to information contained within the vulnerability database 522 but be inconclusive as to risk. For example, the security assessment system 202 may determine that, based on file timestamps, file descriptions, execution time, and calling process of an instance of an application that the application (or a file called by the instance) may be suspicious or vulnerable but still be inconclusive (e.g., the vulnerability database 522 may be silent as to the application or file or some indicators appear to suggest that the application or file is vulnerable while other indicators support the application or file being suspicious or trusted). The report module 514 may report the application or file as being inconclusive. In some embodiments, the security assessment system 202 may track the suspicious application or file closely in future assessments to attempt to reach a conclusion, the security assessment system 202 may contact an agent 400 on the digital device to request more information, or the security assessment system 202 may recommend or command that a limited network scan occur to target only those applications and/or files that are suspicious.

Those skilled in the art will appreciate that the vulnerability database 522 may also comprise behavioral rules that may indicate safe or vulnerable behavior. For example, information contained within the records (e.g., segments indicating file timestamp, execution time, and/or calling process) may be identified as suspicious behavior based on the behavioral rules of the vulnerability database 522. The rules may be established by a network administrator or other security professional to generally flag insecure behavior that may be revealed in the records. In some embodiments, the behavioral rules may be different for different digital devices, applications and/or files. For example, certain digital devices (e.g., "mission critical" digital devices) may have expected and established behaviors. Records that indicate that a specific digital device is behaving in an unusual manner may be flagged by the behavioral rules.

The report module 514 may generate any kind of report indicating the results of one or more assessments. Information contained within the report may include the digital device, one or more users of the digital device, applications and files identified by the records which may be safe, vulnerable, suspicious, or unknown, or any other kind of information. The report module 512 may provide the report to the digital device associates with the assessment, the security administrator system 220, a network administrator, or any digital device(s) or individual(s).

In some embodiments, the security assessment system 202 has access to or is in communication with other devices that has access to user login information which may allow the assessment module 512 to determine which user was logged in at the time one or more records of the assessment request were generated as well as the network rights of the user at the time the records were generated. The report may indicate that a user with limited rights utilizes a potentially suspicious application or file. The report may also indicate or otherwise provide alerts if a user with administrator rights or root access utilized a vulnerable program with dangerous exploits or a file that is very suspicious.

The alert module 516 may generate an alert based on the assessment. If one or more applications or files identified within the records of the assessment request are classified as vulnerable or highly suspicious, the alert module 516 may generate an alert. The alert may flag the vulnerability, potentially identify the exploit, indicate the degree of danger, or provide any other information. The alert may be provided in any manner. For example, the alert module 516 may provide one or more alerts via email, SMS text message, MMS, web page, intranet alert, extranet alert, or any other way.

A network administrator or security professional may allow any degree of risk. In some embodiments, a network administrator may not require alerts or reports unless a file or application is identified that is on a blacklist or on a greylist (which identifies one or more applications as suspicious or highly suspicious). The degree of risk may be based on the vulnerability, danger of exploit, or suspiciousness of an application or file identified by the assessment module 512. The degree of risk may also be based on the rights of the user at the time that the application or file was accessed or executed (e.g., if the user had "superuser" rights).

In various embodiments, a network administrator or security expert may establish a risk threshold for one or more digital devices, one or more users, and/or one or more applications and/or files. In one example, the report module 514 or alert module 516 may generate a report or generate an alert if the assessment module 512 based on the relevant risk threshold (e.g., determined that a risk value exceeds a relevant risk threshold).

In some embodiments, not all records contain useful information. Although the agent 400 (see FIG. 4) may be configured to ignore records that are unlikely to contain useful or relevant information for the security assessment system 202, the information retrieval module 510 may determine that some records received are unlikely or do not have relevant information.

Although identified in FIG. 5 as databases, the record management database 518, risk acceptance configuration database 520, and vulnerability database 522 may each comprise any number of data structures of any type. Further the record management database 518, risk acceptance configuration database 520, and vulnerability database 522 may each be on any number of digital devices (e.g., one or more of the databases may be distributed on any number of digital devices).

Those skilled in the art will appreciate that the modules identified in FIG. 5 may perform more or less functionality as described herein. For example, some modules may perform the functions of other modules. Further, functions shown with respect to FIG. 5 are not limited to a single digital device but may be performed by multiple digital devices performing different functions. In some embodiments, multiple digital devices perform functions simultaneously.

Figure 6:
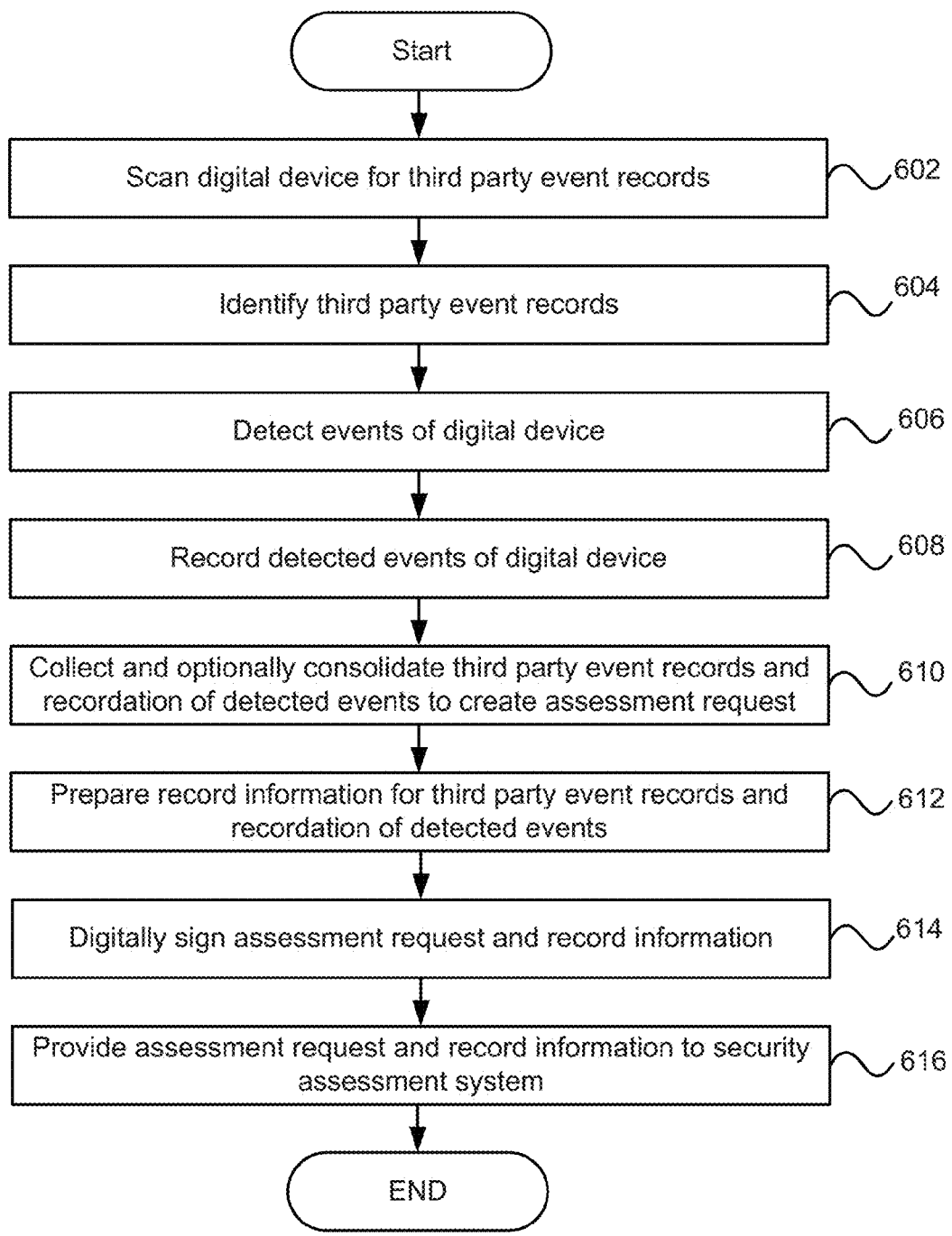
FIG. 6 is a flowchart for collection and preparation of records by a user device in some embodiments.

FIG. 6 is a flowchart for collection and preparation of records by a user device in some embodiments. In step 602, the scan module 406 of the agent 400 scans the digital device for third party event records. In some embodiments, the scan module 406 scans for records directly. In various embodiments, the scan module 406 scans for applications that generate records and/or the records themselves. In step 604, based on the scan, the scan module 406 may identify third party event records.

In various embodiments, records are generated during the execution or termination of an instance of an application. For example, a third party application may generate a record to record occurrences of related processes, the activities of the application instance, process calls, application calls, file calls, errors, utilizing of system resources, or any other information. The purpose of the application generating the record as well as the purpose of the record may not be security related (e.g., for backup, error handling, performance, record of activities, bug fixes, memory management, and/or the like). Records and the exemplary processes of record generation are further described herein.

In step 606, the event detection module 402 may detect events on the digital device. Events may include the execution of an executable (e.g., an application). For example, in some embodiments, the agent 400 may monitor processes to detect the execution of one or more executables. In step 608, the event recordation module 404 may record information and generate records. The event recordation module 404 may, for example, record names of addressed applications and files, versions of applications and file, producers of applications and files, sizes of applications and files, checksums of applications and files, locations/paths of applications and files, descriptions of applications and files (e.g., collect application and file attributes), or any other information. In some embodiments, the event recordation module 404 may record information during execution or termination of an instance of an application and may record the information that may be utilized in the assessment. In one example, while records generated by third party applications may contain information that is not relevant to security assessment, the event detection module 402 and/or the event recordation module 404 may generate records containing relevant information or information that may assist in the assessment process even if the information is not ultimately used during assessment.

In step 610, at periodic times or when one or more records are available, a record collection module 408 may detect when one or more records are generated by third party applications and/or the event recordation module 404. The record collection module 408 may collect the record(s) (e.g., copy the record(s)) to provide to the security assessment system 202 as an assessment request. If there is more than one record, the record collection module 408 may consolidate the records (e.g., combine the records into one or more files). In some embodiments, the record collection module 408 may compress the consolidated records and/or unconsolidated records.

In step 612, the record collection module 408 may prepare record information for collected records. The record information may identify the records, types of records, locations of record information in one or more consolidated files, or the like. The record information may describe one or more of the records. The record information may be utilized by the security assessment system 202 to identify the records and retrieve tools (e.g., applicable rules and/or filters) to locate relevant information from the records.

In step 614, the optional communication authentication module 412 may digitally sign the assessment request and/or record information. In step 616, the communication module 410 may provide the assessment request and record information to the security assessment system 202.

Figure 7:
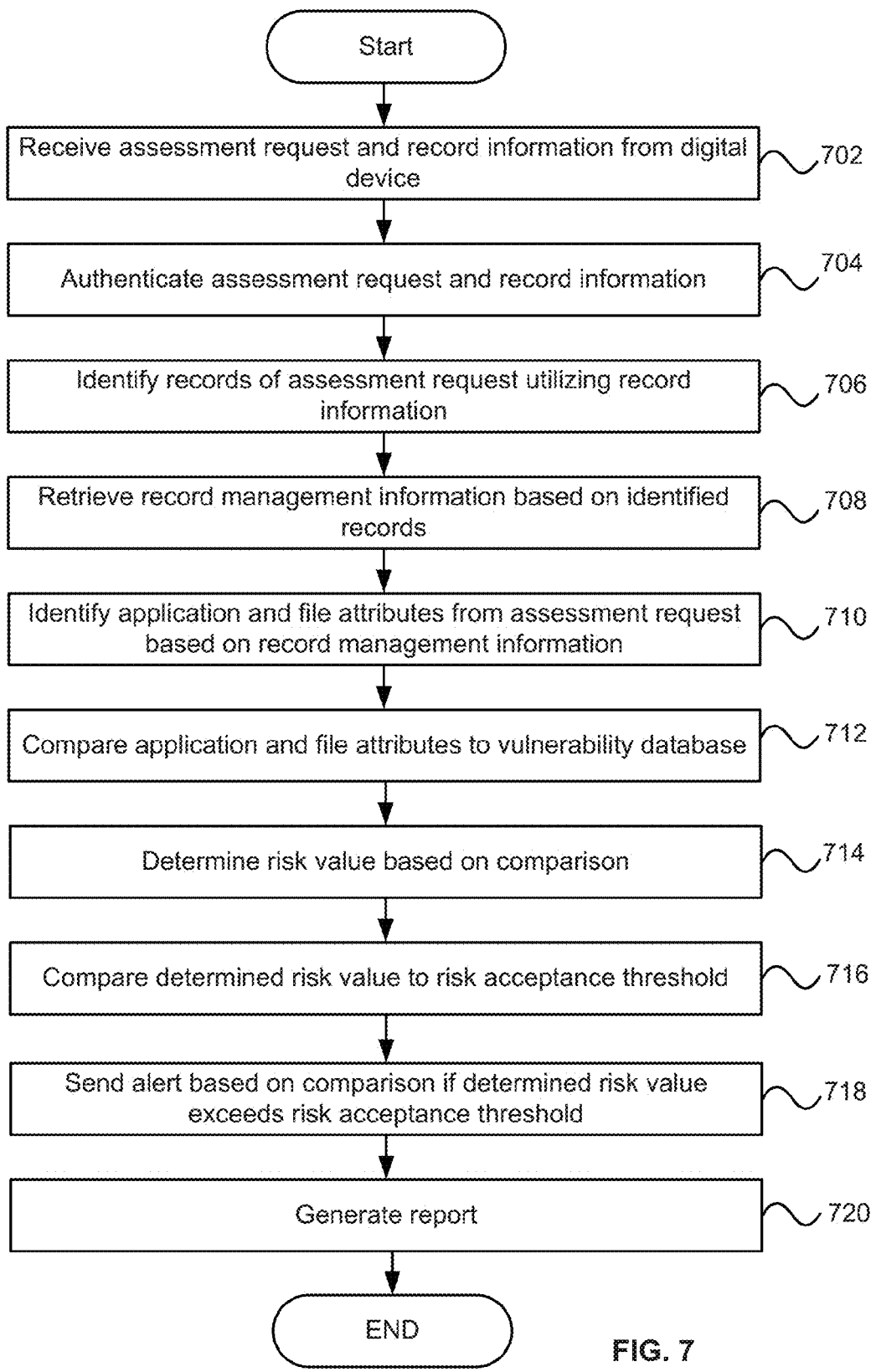
FIG. 7 is a flowchart for comparing segments contained within the collection against whitelist, blacklists, and/or greylists to report vulnerabilities in some embodiments.

FIG. 7 is a flowchart for comparing segments contained within the collection against whitelist, blacklists, and/or greylists to report vulnerabilities in some embodiments. In step 702, a communication module 502 of a security assessment system 202 receives an assessment request and record information from a digital device. The communication module 502 may identify the digital device and or agent 400 on a digital device based on the assessment request, record information, or other data provided by the digital device.

In step 704, the optional request authentication module 504 may authenticate the assessment request and/or record information from the digital device. In some embodiments, the security assessment system 202 may assign an encryption key to an agent and/or a digital device to digitally sign and/or encrypt all or part of the assessment request and/or record information. In some examples, the optional request authentication module 504 may authenticate or verify the accuracy of the assessment request, the accuracy of the record information, the identity of the sending digital device, the identity of the agent, or the like.

In some embodiments, an assessment scheduler 506 may schedule a time or a condition to be satisfied before the assessment may be conducted. In one example, the assessment scheduler 506 may, based on assessments previously received and/or predicted availability of resources, schedule a date and/or time for the assessment of the information contained in the assessment request. In another example, the assessment scheduler 506 may determine the availability of resources and control the initiation of the assessment based on the determination. In some embodiments, the assessment scheduler 506 may queue all assessment requests in order and command that each assessment request of the queue be assessed in order when resources are available. Those skilled in the art will appreciate that there may be many ways to schedule assessments.

In step 706, the record management module 508 identifies records of assessment request utilizing record information. In some embodiments, if the assessment request includes a single record generated by the agent, no record information may be provided and the step is optional. If the assessment request includes records generated by other applications that are not the agent 400, record information may be provided by the digital device to identify the type of records contained in the assessment request.

In some embodiments, the record management module 508 does not receive record information. The record management module 508 may scan one or more records to determine the record name or type or, in some embodiments, the record management module 508 scans for relevant information from the records (e.g., for application and file attributes). For example, the record management module 508 may be trained (e.g., information from a record may be compared to previously determined record information contained in a data structure) to identify records based on scanning the records.

In some embodiments, the record management module 508 receives records that are consolidated. The record management module 508 may utilize record information received from the digital device and/or scan the consolidated files to determine the types of records as well as the locations of records.

In step 708, the information retrieval module 510 may retrieve record management information based on identified records. For example, a record generated by a third party may have specific segments that are relevant to the assessment. Based on the type or identity of the record, the information retrieval module 510 may retrieve record management information that may identify the segments and/or portions of the record that are relevant to the assessment. The information retrieval module 510 may retrieve the record management information from a record management database 518.

In step 710, the assessment module 512 identifies application and file attributes (e.g., relevant information) from the assessment request utilizing the segments and/or portions of the records using the record management information. In step 712, the assessment module 512 may compare the identified application and file attributes to all or part of the vulnerability database 522. In some embodiments, the record management information and/or record information may identify the content of the segment(s) or portion(s) of the record(s). The identified content of a segment or portion of a record may be compared to only the relevant information in the vulnerability database 522 (e.g., an application checksum may only be compared to stored application checksums within the vulnerability database 522 and not, for example, to the application name). In some embodiments, the record management module 508, the information retrieval module 510, and/or the assessment module 512 scans the records to determine the relevant portion of the vulnerability database 522 to compare.

In step 714, the assessment module 512, report module 514, and/or alert module 516 may optionally determine a risk value based on the comparison. In some embodiments, the vulnerability database 522 may include scores or other values indicating the likelihood that certain applications or files may be suspicious, trustworthy, or vulnerable. The assessment module 512, for example, may track all scores or other values associated with the application and file attributes to determine an overall risk value based on one or more assessment requests and/or other information regarding the digital device that provided the assessment request.

In step 716, the alert module 516 may compare one or more risk values associated with the assessment (e.g., the overall risk value) to a risk acceptance threshold. The risk acceptance threshold may be a default value or may be established by a network administrator or other authorized person or device. The risk acceptance threshold may be different for different applications, files, users, networks, and/or digital devices.

In step 718, the alert module 516 sends an alert based on the comparison. The alert may be sent to any device and/or individual.

In step 720, the report module 514 generates a report based on the assessment. In one example, the report identifies the application and file attributes that were assessed as well as the results of the assessment. The report may include a history for the user and/or digital device that provided the records (e.g., results of past assessment). The report may identify whitelisted applications and files and/or blacklisted applications and files. The report may also include any applications or files associated with a greylist.

In various embodiments, the report may include suggestions, courses of corrections, warnings, or the like. The report may further include links to updated programs and/or patches.

In various embodiments, the assessment module 512 may track the user and the user's network rights when one or more files or applications are accessed. As a result, the assessment module 512 may identify potential danger and the potential damages that a user with superuser or "elevated" rights may incur by utilizing vulnerable applications and files. In one example, the assessment module 512 may obtain the identity of the user as well as the network rights of the user at the time one or more records were generated.

The report module 514 may identify the user(s) as well as their related network rights when accessing one or more applications and/or files.

Figure 8:
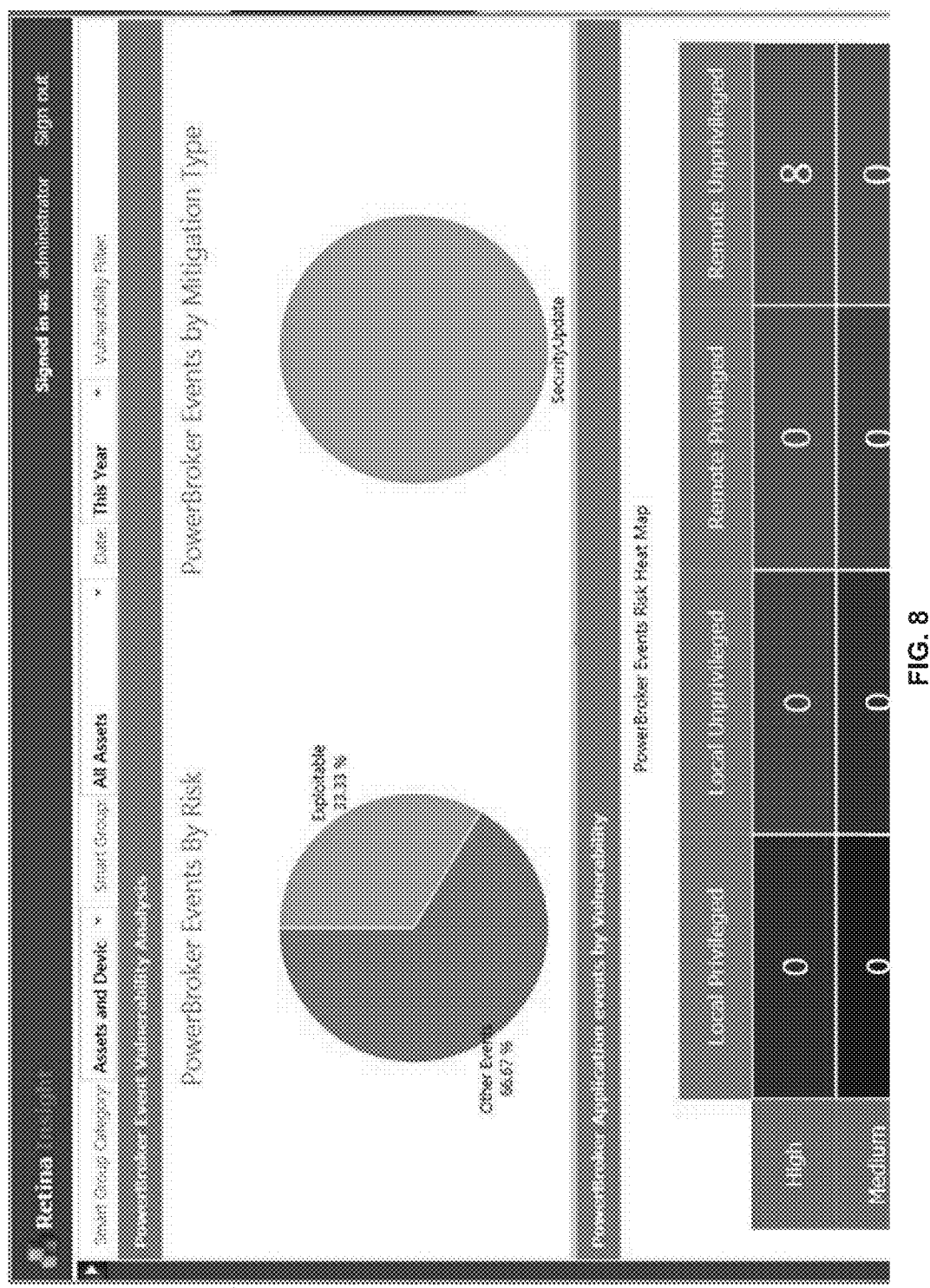
FIG. 8 is an exemplary report generated by the security assessment server in some embodiments.

FIG. 8 is an exemplary report 800 generated by the security assessment server in some embodiments. The integration of identity management and vulnerabilities may produce a perspective. Using tools like PowerBroker for Windows and Retina may indicate what applications are executing on a host, what user privileges they are executing with, and what risk they represent using standards like CVSS and if the vulnerability is available in an exploit toolkit or not. Consider the dashboard depicted in FIG. 8.

In this example, eight applications have been executed that have a high Common Vulnerability Scoring System (CVSS) score in relationship to the vulnerabilities identified during runtime. 33.33% are exploitable and can be compromised with toolkits easily accessible for purchase or download. Some embodiments described herein detect and report when an application was run, who executed it, and what privileges were used at the time the application was run. Various embodiments may correlate the information to vulnerabilities and other metrics. All of this information may be available as dashboards and comprehensive reports.

Those skilled in the art will appreciate that, in some embodiments, the perspective provided by the report is more than a traditional phone book of found vulnerabilities. Further, some embodiments provide for more than simply controlling and metering application usage by system and user for privilege identity management. Some embodiments described herein are new type of fusion of vulnerability and identity management which links real world user activity to the risk of the applications they operate on a daily basis. Whether the vulnerability is a zero day or an unpatched legacy vulnerability, understanding the risk by user, permissions, system, and application may provide superior guidance for remediation, mitigation, and exclusions than just a massive report list of found vulnerabilities identified in a network scan of the prior art.

Those skilled in the art will appreciate that reports may contain any information regarding the assessment.

Figure 9:
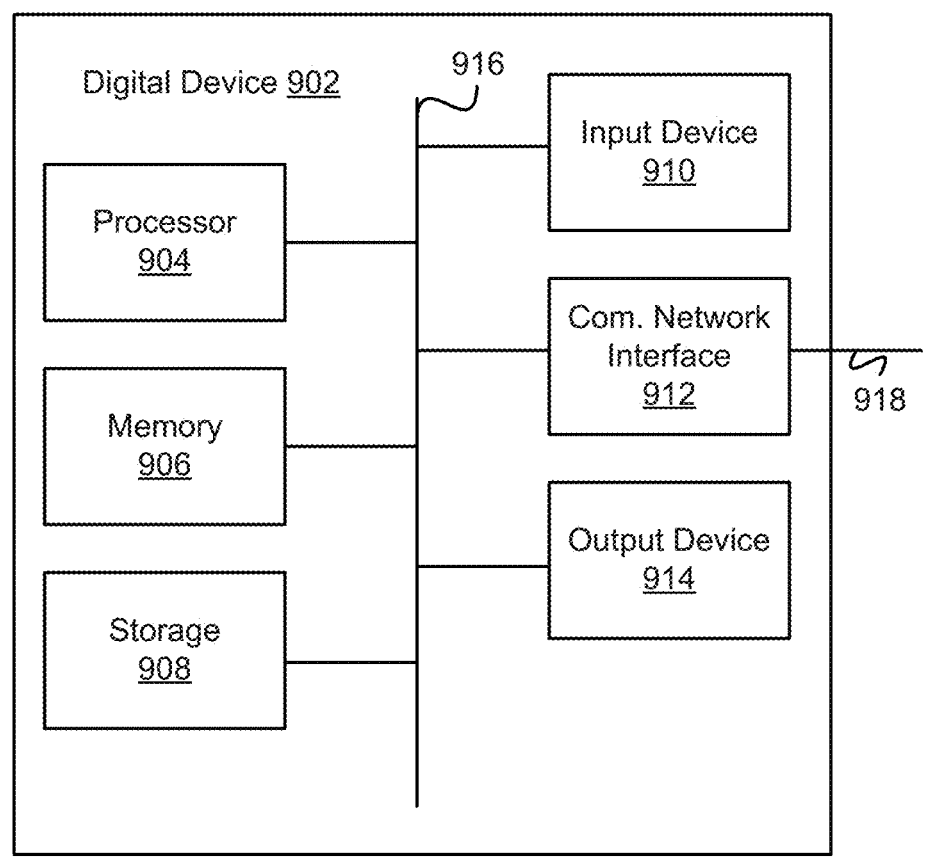
FIG. 9 is a block diagram of an exemplary digital device.

FIG. 9 is a block diagram of an exemplary digital device. The digital device 902 comprises a processor 904, memory system 906, storage system 908, an input device 910, a communication network interface 912, and an output device 914 communicatively coupled to a communication channel 916. The processor 904 is configured to execute executable instructions (e.g., programs). In some embodiments, the processor 904 comprises circuitry or any processor capable of processing the executable instructions.

The memory system 906 stores data. Some examples of memory system 906 include storage devices, such as RAM, ROM, RAM cache, virtual memory, etc. In various embodiments, working data is stored within the memory system 906. The data within the memory system 906 may be cleared or ultimately transferred to the storage system 908.

The storage system 908 includes any storage configured to retrieve and store data. Some examples of the storage system 908 include flash drives, hard drives, optical drives, and/or magnetic tape. Each of the memory system 906 and the storage system 908 comprises a computer-readable medium, which stores instructions or programs executable by processor 904.

The input device 910 is any device such an interface that receives inputs data (e.g., via mouse and keyboard). The output device 914 is an interface that outputs data (e.g., to a speaker or display). Those skilled in the art will appreciate that the storage system 908, input device 910, and output device 914 may be optional. For example, the routers/switchers 110 may comprise the processor 904 and memory system 906 as well as a device to receive and output data (e.g., the communication network interface 912 and/or the output device 914).

The communication network interface (com. network interface) 912 may be coupled to a network (e.g., computer network 126) via the link 918. The communication network interface 912 may support communication over an Ethernet connection, a serial connection, a parallel connection, and/or an ATA connection. The communication network interface 912 may also support wireless communication (e.g., 802.11a/b/g/n, WiMax, LTE, WiFi). It will be apparent to those skilled in the art that the communication network interface 912 can support many wired and wireless standards.

It will be appreciated by those skilled in the art that the hardware elements of the digital device 902 are not limited to those depicted in FIG. 9. A digital device 902 may comprise more or less hardware, software and/or firmware components than those depicted (e.g., drivers, operating systems, touch screens, biometric analyzers, etc.). Further, hardware elements may share functionality and still be within various embodiments described herein. In one example, encoding and/or decoding may be performed by the processor 904 and/or a co-processor located on a GPU (i.e., Nvidia).

Current security solutions block malicious applications using a variety of techniques including, for example, antivirus signatures, heuristic algorithms, and sandbox analysis. These approaches focus on whether an application has been identified as malicious or contain characteristics, under test conditions (e.g., within a sandbox) that could cause malicious behavior on a host. For example, these solutions identify malware from legitimate applications.

As opposed to solutions that identify malware, some embodiments herein allow for application protection from vulnerabilities. For example, embodiments herein may detect launch of an application and determine, based on potential risk of the application, whether the application is allowed to launch and/or if the application is allowed to launch with modified permissions. Potential risk may include, for example, whether there are vulnerabilities associated with the launching application. In one example, an agent on a digital device may detect a launch of an application, identify the application, and identify whether there are known vulnerabilities associated with the application. The application may not be malware but rather be a legitimate application with known vulnerabilities (e.g., a well-known application for playing flash on a browser; the flash player may have vulnerabilities that may be exploited). If a vulnerability is identified (e.g., from risk information), the agent may allow the application to launch, bar the application from launching, or modify functionality of the application based on permissions and the identified vulnerability.

The decision to allow any application to launch has been traditionally tied to an antivirus program, host based intrusion prevent solutions, and black listing applications based on malicious intent. Various embodiments described herein may decide whether an application may launch or have the launching application's permissions modified, based on the potential risk based on vulnerabilities or other risk criteria.

In one example, traditional anti-malware scanners may not flag or otherwise limit an old and faulty version of a PDF reader (e.g., Adobe Acrobat Reader) because the PDF reader is a legitimate application (i.e., not malware such as a virus or Trojan horse). The PDF reader, however, may contain vulnerabilities. The vulnerabilities alone may not represent a risk unless an exploit or malware was present to take advantage. Some embodiments describe herein, however, may detect when the PDF reader is to launch, identify the application including, in some embodiments, the version of the application, identify known risks (e.g., vulnerabilities) from risk information associated with the PDF reader, and take action (e.g., stop the PDF reader from launching).

Figure 10:
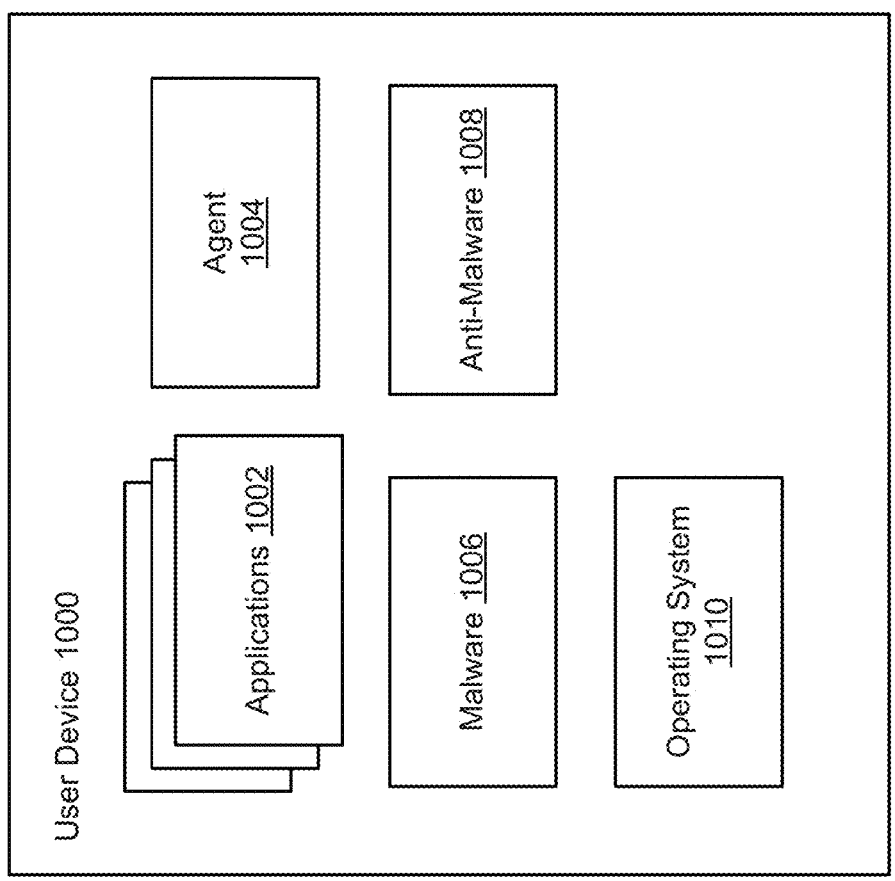
FIG. 10 is a block diagram of a user device in some embodiments.

FIG. 10 is a block diagram of a user device 1000 in some embodiments. The user device 1000 may be any digital device. Some examples of the user device 1000 include, but are not limited to the smartphone 206, tablet device 208, laptop 210, or PC 214 described with regard to FIG. 2. The user device 1000 comprises applications 1002, agent 1004, malware 1006, anti-malware 1008, and an operating system 1010.

Applications 1002 may include any legitimate application. An application is any program designed to enable end users to perform specific tasks, such as word processing or communication. A legitimate application may be any application that is not malware (e.g., Trojan horse, worm, virus, or software that is intended to damage or disable computers or computer systems). Legitimate applications may include, for example, word processing programs, operating systems, browsers, spreadsheets, readers, players, database applications, email applications, design applications, or the like. Those skilled in the art will appreciate that there may be any number of applications 1002. In various embodiments, applications 1002 comprise applications that have been installed and/or configured by the user of the user device 1000, administrator, and/or other trusted individual.

The agent 1004 resides on the user device 1000 and may be configured to control execution of one or more applications 1002 based on risk information and rules. Risk information may include information regarding potential vulnerabilities, including, for example, whether there are one or more known vulnerabilities associated with an application or the potential risk associated with one or more vulnerabilities. Alternately or additionally, risk information may include a risk value and/or an indication of the likelihood that the one or more vulnerabilities of the application(s) may be exploited. The risk information may include a date when one or more vulnerabilities were first identified, a Common Vulnerability Scoring System score (i.e., CVSS score), a number of days a vulnerability has been publicly known, number of days an application has been unpatched, whether an application is not compliant with a regulatory standard, whether an application can only be run as a standard user, whether a public exploit exists, or the like.

A risk value is at least one value indicating a degree of risk associated with an application. The risk value may be based, at least in part, on whether at least one vulnerability associated with the application has been detected, a number of vulnerabilities associate with an application has been detected, the likelihood of exploitation, the potential damage to the user device 1000 if exploited, the potential damage to systems in communication with the user device 1000 if exploited, or the like. Those skilled in the art will appreciate that generation of CVSS scores may follow a standard methodology and that risk values may be custom generated by an administrator or the like based on the needs of one or more systems.

The agent 1004 may control execution of one or more applications based on rules. Rules may be identified based on the risk information. For example, a rule may allow or disallow an application to launch based on whether at least one vulnerability associated with the application has been detected, a number of vulnerabilities associate with an application has been detected, the likelihood of exploitation, the potential damage to the user device 1000 if exploited, the potential damage to systems in communication with the user device 1000 if exploited, and/or the like.

A rule may apply to all applications or a subset of applications of the applications 1002. In one example, a rule may instruct the user device 1000 to allow or deny launch of any application with one or more known or suspected vulnerabilities that have been known or suspected for more than a predetermined period of time. The rule may instruct the user device 1000 to allow or deny launch of any application with one or more known or suspected vulnerabilities if unpatched for over a predetermined period of time. In another example, the rule may instruct the user device 1000 to allow or deny launch of any application with one or more known or suspected vulnerabilities if a public exploit for the one or more known or suspected vulnerabilities exist and/or if a user account used to attempt to launch the application is privileged (e.g., root access).

Figure 11:
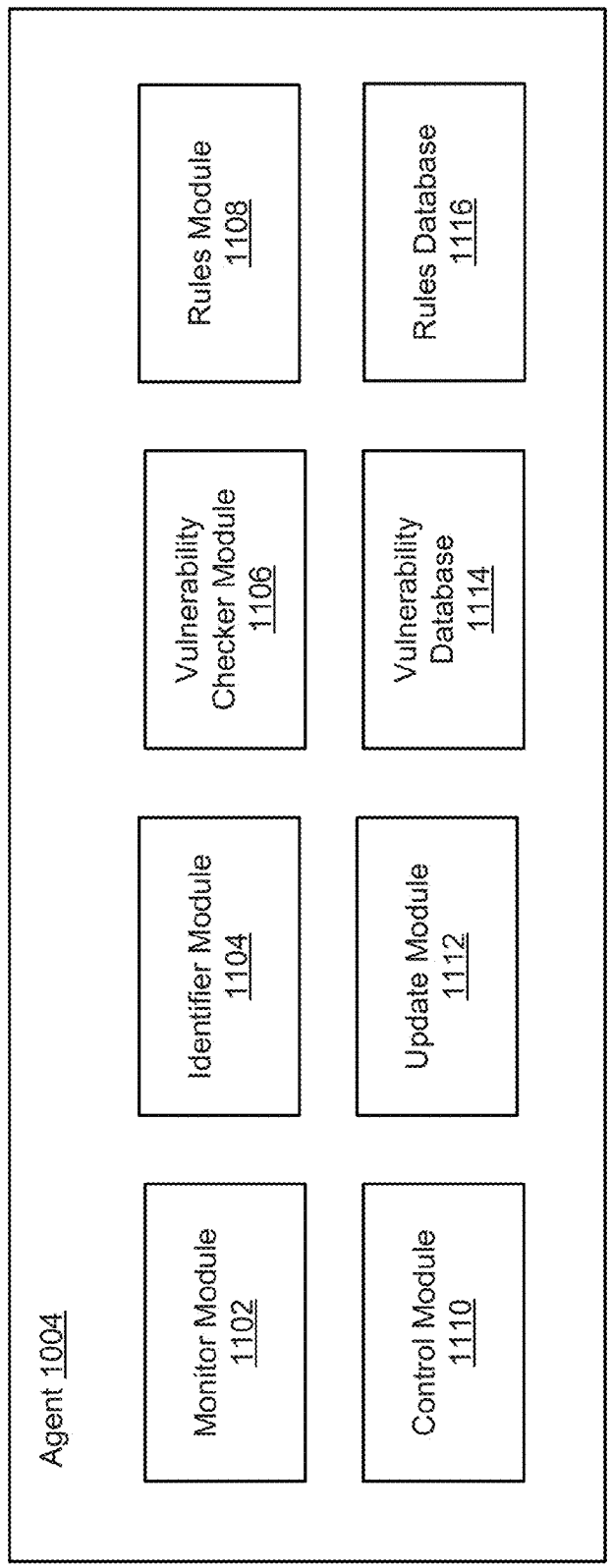
FIG. 11 is a block diagram of an agent that may be on a user device in some embodiments.

The agent 1004 is further described with regard to FIG. 11.

Malware 1006 is any malware the function of which is to damage and/or steal information from the user device 1000 and/or another digital device on a network. The user device 1000 may not always include malware 1006. The malware 1006 may be detected and/or quarantined by anti-malware 1008. Malware 1006 does not include legitimate application(s) as discussed herein.

Anti-malware 1008 is any security application configured to detect malware 1006. Anti-malware 1008 may include, for example, an anti-virus application, firewall application, malware scanner, or the like. Those skilled in the art will appreciate that although the anti-malware 1008 may identify malware 1006 as discussed herein, the anti-malware 1008 may not identify vulnerabilities of legitimate applications (i.e., applications 1002), detect when one or more applications 1002 is to launch, and/or control execution of the applications 1002 based on risk information associated with the applications 1002 and rules.

Operating system 1010 may be any operating system. For example, the operating system 1010 may be Microsoft Windows, OSX, Unix, BSD, or any other operating system. In some embodiments, the agent 1004 may include an API and/or a module in communication with the operating system 1010 to detect when an application is to be launched.

FIG. 11 is a block diagram of an agent 1004 that may be on a user device 1000 in some embodiments. The agent 1004 comprises a monitor module 1102, an identifier module 1104, a vulnerability checker module 1106, a rules module 1108, a control module 1110, an update module 1112, a vulnerability database 1114, and a rules database 1116.

The monitor module 1102 is configured to monitor a user device 1000 for a launch of an application (e.g., at least one application of the applications 1002). In various embodiments, all or part of the monitor module 1102 intercepts and/or otherwise receives calls to the operating system 1010 to launch an application. The launching application may be a legitimate application. As discussed herein, the application may be any executable.

In various embodiments, all or part of the monitor module 1102 may have hooks within the operating system 1010 (e.g., the monitor module may have hooks in the kernel). The monitor module 1102 may detect commands or calls to launch an application or may intercept such commands or calls.

The identifier module 1104 is configured to identify the launching application and/or one or more attributes of the launching application. For example, the identifier module 1104 may identify the launching application as well as the launching application's version. All or part of the identifier module 1104 may be within or in communication with the operating system 1010, resident in memory (e.g., RAM) of the user device 1000, or in communication with any component(s) of the user device 1000.

In various embodiments, prior to the application being commanded to launch, the identifier module 1104 may scan all or parts of the user device 1000 to identify applications and/or attributes (e.g., versions) of the application. The application identifier and/or attributes may be stored or cached. When the monitor module 1102 detects a command or call to launch the application, the identifier module 1104 may identify the launching application based on the previously stored or cached information.

In some embodiments, if the information is not previously available, the identifier module 1104 may scan the application or files associated with the application to identify the application and/or attributes of the application. In various embodiments, the identifier module 1104 intercepts commands associated with launching the application. The identifier module 1104 may scan files and executables associated with the launching application to identify the application and/or attributes associated with the launching application. In one example, the identifier module 1104 retrieves and scans files from a directory associated with the launching application. The identifier module 1104 may generate an application identifier or retrieve an application identifier from the scanned directory. In various embodiments, the identifier module 1104 and/or security server 1200 (see FIG. 12) may scan the user device 1000 or receive records and parse file identifiers and/or attributes from the records as described herein to identify the one or more applications and/or attributes. If the security server 1200 identifies the application identifier and/or attributes, the information may be provided to the agent 1004.

In some embodiments, the identifier module 1104 retrieves an application identifier from a stored plurality of application identifiers. The retrieval of the application identifier may be based on information from scanning the directory of the launching application. The application identifier may be a name of an application, a value (e.g., code), a hash, or any other information that may identify the launching application.

Attributes may identify the version of the launching application or any other information which may be used to identify the launching application. Attributes may include any information including, for example, the file attributes (see the description regarding FIG. 2).

Those skilled in the art will appreciate that, in some embodiments, the application identifier (without version number of any other attributes) may be utilized to retrieve risk information. For example, a hash of an application, location of a directory, or other information may be sufficient to retrieve risk information and/or rules.

In various embodiments, the identifier module 1104 may also identify the user login status of the user seeking to launch the application. For example, the identifier module 1104 may detect if the user calling to launch the application is signed in as a trusted or elevated account (e.g., whether the user has active administrative or superuser rights). Those skilled in the art will appreciate that exploited vulnerabilities of an otherwise legitimate application may take advantage of administer rights to further damage the user device 1000 or trusted systems on a network in communication with the user device 1000.

The vulnerability checker module 1106 is configured to utilize the identified application and/or attributes to retrieve risk information. Risk information is any information associated with risk of the launching application. The risk information may include number of known vulnerabilities associated with the launching application, information regarding one or more specific vulnerabilities associated with the launching application, number of days (or any amount of elapsed time) the launching application has been unpatched, number of days (or any amount of elapsed time) since one or more vulnerabilities associated with application has been detected, whether one or more public exploits of one or more vulnerabilities exist, potential damage associated with one or more vulnerabilities to the user device 1000, potential damage associated with one or more vulnerabilities to a trust device of a network in communication with the user device 1000, CVSS scores of one or more vulnerabilities, risk values, available patch(es) that have not been utilized, number of days since unutilized patch(es) has been available, and/or the like.

The risk information may be stored in a vulnerability database 1114. For example, the vulnerability checker module 1106 may retrieve risk information based on an application identifier (e.g., Adobe Acrobat Reader) and a version number (e.g., version 11.0.01) and/or any other attribute(s) received from the identifier module 1104. In this example, the risk information may indicate that there are three known vulnerabilities with publicly available exploits. The risk information may also indicate that two of the known vulnerabilities have been known for more than 60 days. In another example, the risk information may comprise one or more CVSS scores.

The rules module 1108 may be configured to retrieve one or more rules from the rules database 1116 based on the risk information. Rules may comprise policies and/or rules that indicate one or more actions to be taken based on the risk information. Rules may be specific to a specific application, application versions, and/or other attributes of applications. Rules may also apply to all applications or groups of applications (e.g., critical applications may be grouped together by one or more permissions, important applications may be grouped together by one or more other permissions, and non-essential applications may be grouped together by other permission(s)).

In various embodiments, the rules module 1108 does not retrieve different rules based on the risk information. In some embodiments, the rules module 1108 comprises one or more data structures of rules associated with the risk information. The control module 1110 may be configured to perform tasks based on the strictest applicable rule. An applicable rule is a rule that applies to the launching application based on the retrieved risk information from the vulnerability checker module 1106. The strictest applicable rule is an applicable rule that restricts the launching application the most when compared to activities associated with other applicable rules.

For example, rules may be sorted in a table wherein the rules associated with risk information that results in blocking the launching application is listed first and the rules associated with risk information that results in allowing the launching application without modification or to launch may be listed last. Rules associated with risk information that results in the control module 1110 allowing the launching application to launch but disabling functions (e.g., modifying permissions) or requiring further functions may also be sorted in the list based on the most restrictive requirements. Once the rules module 1108 identifies an applicable rule from the strictest category (e.g., block the launching application from launching), the rules module 1108 may not retrieve or identify any other applicable rules and the control module 1110 may block the launching application from launching.

The rules module 1108 may identify any number of rules associated with risk information of a launching application and the control module 1110 may control the launching application based on one or more rules. For example, a rule may instruct the control module 1110 to block launching of any application with a CVSS score greater than a predetermined threshold.

Rules may stop the launching application from launching or allow the launching application to launch with or without modified permissions. Exemplary rules that may instruct the control module 1110 to stop a launching application or allow the application to launch with modified permissions include, but are not limited to:

The vulnerability was publically disclosed "n" days ago.
The vulnerability was detected on the user device 1000 "n" days ago.
The launching application violates any regulatory standards such as HIPAA.
The launching application can only run as a standard user.
Allow/Deny if a public exploit exists.
Allow/Deny launching application to launch in normal mode if the CVSS score is within predetermined parameters.

Those skilled in the art will appreciate that the rules module 1108 may be optional. For example, the control module 1110 may receive the risk information and act on the applicable rule(s) based on the risk information.

The control module 1110 is configured to control the launching application based on one or more applicable rules. In one example, if there are no applicable rules, the control module 1110 may take no action thereby allowing the launching application to launch without modification. Those skilled in the art will appreciate that one or more applicable rules may instruct the control module 1110 to allow the launching application to launch without modification. In one example of allowing the launching application to launch, the control module 1110, optionally based on one or more applicable rules, may be configured to provide one or more commands to launch the application. In some embodiments, the control module 1110, based on one or more rules, may allow a launching application to launch if the user is not logged in as an administrator or has superuser rights. In another example, the control module 1110, based on one or more rules, may allow a launching application to launch if the user is logged in as a standard user, a user with specific rights, a user without specific rights, or a user with limited rights.

In some embodiments, the control module 1110 may bar the launching application from launching based on one or more applicable rules. For example, based on one or more applicable rules, the control module 1110 may intercept one or more commands to launch an application based on the rules. In some embodiments, the control module 1110 may provide one or more commands to terminate an application or a process associated with the application.

In various embodiments, the control module 1110, based on the rules, may modify permissions associated with the legitimate application. In one example, if a launching application is a browser, the control module 1110 may allow the browser to launch with limited functionality (e.g., disabling Flash, javascripts, cookies, or the like). In another example, the control module 1110 may allow the browser to launch with different settings (e.g., set privacy settings to high, activate pop-up blocker, increase security for zones, limit browser access to trusted sites, activate logging of application activities, and/or the like).

The vulnerability database 1114 includes any data structure that contains information to assist in the identification of vulnerabilities or risks associated with applications. In one example, the vulnerability database 1114 contains information to assist in the identification of vulnerabilities or risks associated with legitimate applications. In another example, the vulnerability database 1114 contains information to assist in the identification of vulnerabilities or risks associated with any applications. Those skilled in the art will appreciate that the vulnerability database 1114 may include any data structure(s) and may not necessarily include a database.

The rules database 1116 is any data structure that contains policies and/or instructions associated with actions based on risk information, application identifier, and/or attributes.

In various embodiments, the agent 1004 comprises a communication module configured to provide messages and/or alerts regarding actions taken by the control module 1110. For example, if the control module 1110 blocks an application from launching or otherwise terminates an application, the communication module may notify the user of the user device 1000 that the application has been blocked or terminated. Further, the communication module may provide a message or alert to an administrator (e.g., via email or SMS text) or a digital device indicating the action(s) taken. In various embodiments, the communication module may also notify the user if patches or other options are available that would allow the application to launch.

Those skilled in the art will appreciate that the modules identified in FIG. 11 may perform more or less functionality as described herein. For example, some modules may perform the functions of other modules. Further, functions shown with respect to FIG. 11 are not limited to a single digital device but may be performed by multiple digital devices performing different functions. In some embodiments, multiple digital devices perform functions simultaneously.

Figure 12:
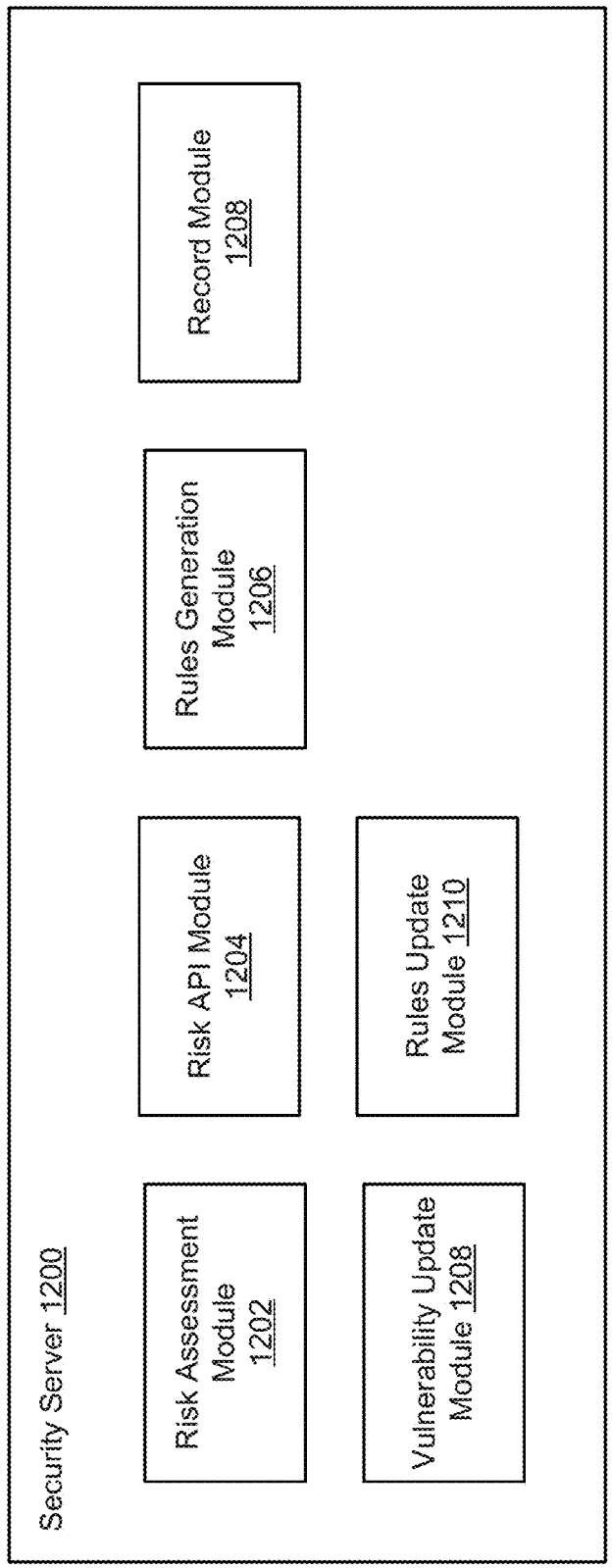
FIG. 12 is a block diagram of a security server that may be in communication with the agent of the user device in some embodiments.

FIG. 12 is a block diagram of a security server 1200 that may be in communication with the agent 1004 of the user device 1000 in some embodiments. The security server 1200 comprises a risk assessment module 1202, a risk API module 1204, a rules generation module 1206, a record collection module 1208, a vulnerability update module 1208, and a rules update module 1210. The security server 1200 may be configured to identify vulnerabilities in applications, prepare and distribute risk information to other digital devices, as well as generate and distribute rules to other digital devices.

The risk assessment module 1202 is configured to identify vulnerabilities and other risks associated with applications. In some embodiments, the risk assessment module 1202 is configured to identify vulnerabilities and other risks associated with legitimate applications.

In various embodiments, the risk assessment module 1202 retrieves information associated with vulnerabilities, patches, updates, and/or other risk information. In one example, the risk assessment module 1202 retrieves information from software manufacturers, software distributors, security software manufactures or vendors, security-oriented websites, blogs, malware alert systems, or any other source that may contain information related to known vulnerabilities, exploits, patches, updates, or other information. In some embodiments, administrators or other users seek out vulnerability and risk information to provide to the risk assessment module 1202.

The risk assessment module 1202 may store the retrieved information as risk information. The risk information may identify one or more vulnerabilities, CVSS scores, and/or risks associated with any number of applications. The retrieved information may be associated with applications (e.g., by application identifier) and/or application attributes (e.g., version). In various embodiments, the risk assessment module 1202 stores, formats, and modifies the information to generate risk information for providing to other digital devices.

The risk API module 1204 is configured to access available APIs of applications and/or websites to retrieve information associated with vulnerability, CVSS score, security, patch, exploit, new version, and/or any other kind of information to generate risk information to be provided to other digital devices. For example, the risk API module 1204 may be configured to access information from Symantec, McAfee, Sophos, blogs, Microsoft, Adobe, application download/update sites, or security websites.

The rules generation module 1206 is configured to generate rules that may be provided to other digital devices. As described herein, in some embodiments, the rules may be generated for one or more specific applications, groups of applications, or all applications. In one example, an administrator may generate a rule and/or policy that any launching application with more than two vulnerabilities and known public exploits are to be blocked. The rule may be provided to other digital devices which may then apply the rule when risk information indicates that the rule conditions are satisfied.

Rules can be generated based on needs of the network or organization. As such, rules can be based on an organization's acceptable risk. For instance, a sensitive system may not allow an application with a critical vulnerability to execute that is older than 30 days for any user. However, on a workstation, that application can only run as a standard user and never as an administrator (regardless of other rules or logon permissions) and, as such, the rule may be modified to allow the application to run in some circumstances.

Further, rules may be generated to address compliance. For example, many regulatory initiatives such as PCI, mandate that vulnerabilities be patched with 30 days if the severity is mapped to a critical status based on the CVSS score. There are monitory penalties if an audit proves non-compliance. In addition, the risk to any organization increases if these vulnerable applications are permitted to execute. This is especially true if they can execute as an administrator. Rules can be generated to automatically block applications from launching that meet this criteria.

The record module 1208 is configured to prepare risk information for distribution to the other digital devices. The record module 1208 may be configured to receive information from the risk assessment module 1202 and/or the risk API module 1204 to generate and prepare risk information for distribution. For example, the risk information may be prepared such that information regarding vulnerabilities, risks and exploits may be retrieved based on application identifiers and/or attributes (e.g., version number). In one example, the record module 1208 normalizes the information to generate the risk information.

In various embodiments, the record module 1208 may prepare rules from the rules generation module 1206 to be distributed to other digital devices. In one example, the record module 1208 may format or otherwise organize the rules such that they may be identified and/or retrieved based on risk information or any other needed information. In some embodiments, the record module 1208 may organize rules, identify duplicates, and/or identify overlapping rules thereby allowing a user, such as an administrator, to make corrections.

The vulnerability update module 1208 is configured to provide risk information to other digital devices such as, for example, user device 1000. The vulnerability update module 1208 may provide all risk information, only new risk information, and/or risk information not previously provided to one or more digital devices.

The rules update module 1210 is configured to provide one or more rules to other digital devices such as, for example, user device 1000. The rules update module 1210 may provide all rules, only new rules, and/or rules not previously provided to one or more digital devices. In some embodiments, the rules update module 1210 may provide one or more rules to one or more digital devices and one or more other rules to one or more other digital devices. For example, critical digital devices may require different (e.g., stricter) rules than rules provided to user devices with limited access to critical information or functions.

Those skilled in the art will appreciate that the modules identified in FIG. 12 may perform more or less functionality as described herein. For example, some modules may perform the functions of other modules. Further, functions shown with respect to FIG. 12 are not limited to a single digital device but may be performed by multiple digital devices performing different functions. In some embodiments, multiple digital devices perform functions simultaneously.

Figure 13:
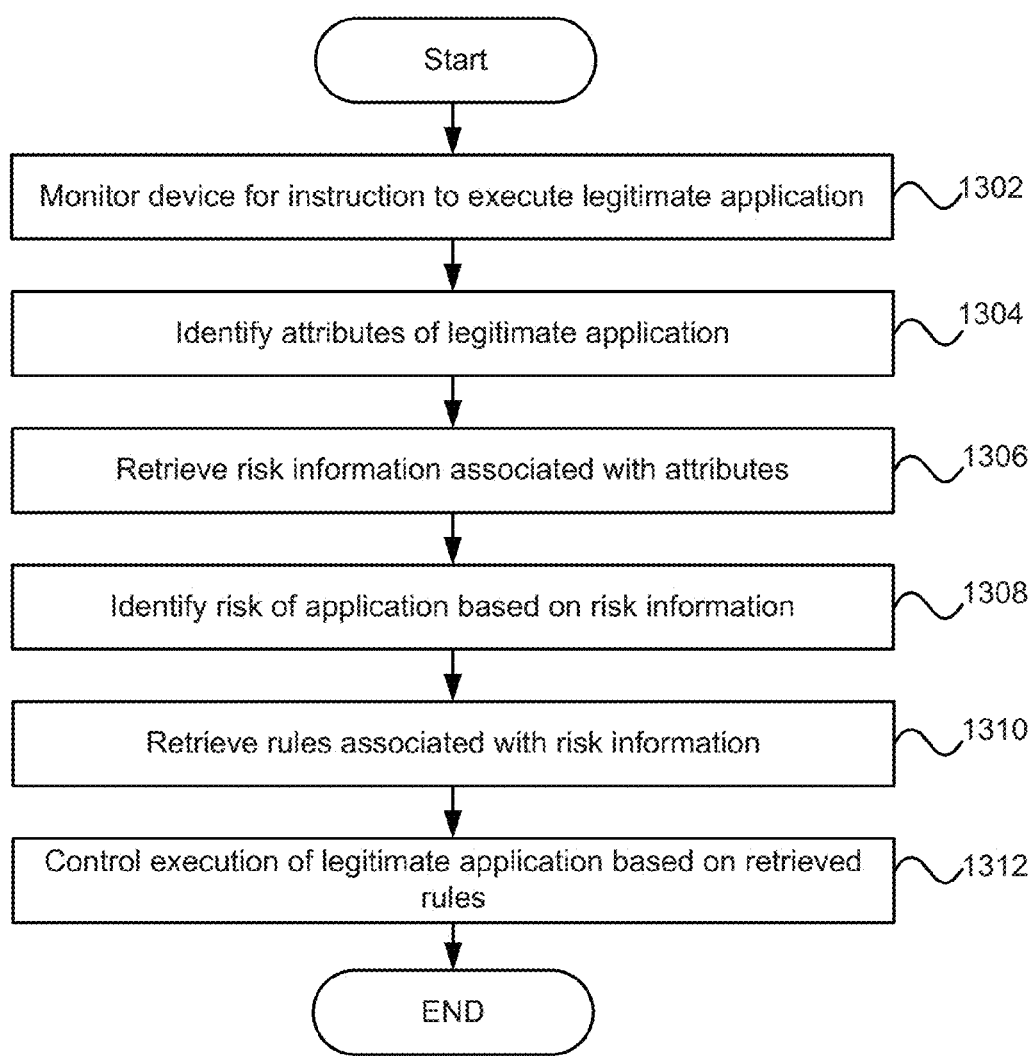
FIG. 13 is a flowchart for controlling execution of an application based on risk information and rules in some embodiments.

FIG. 13 is a flowchart for controlling execution of an application based on risk information and rules in some embodiments. In step 1302, the monitor module 1102 monitors user device 1000 for instruction to execute or launch a legitimate application of applications 1002. The monitor module 1102 may include components within the operating system 1010 to monitor and/or intercept commands or calls to launch or otherwise execute any number of applications of the applications 1002.

In step 1304, the identifier module 1104 identifies one or more attributes of the legitimate application to launch. In some embodiments, the identifier module 1104 previously scanned the application to be launched and/or files associated with the application to be launched. If the identifier module 1104 has not previously identified the application, the identifier module 1104 may retrieve or generate an application identifier, version number, and/or other attributes from the application or from the information related to the application).

The identifier module 1104 may identify the application and/or any number of attributes associated with the application to be launched. In one example, the identifier module 1104 generates or retrieves an application identifier and/or an attribute identifier (e.g., application name and version). In some embodiments, the identifier module 1104 retrieves information (e.g., application identifier and/or attribute(s)) from the monitored and/or intercepted command(s) or call(s).

In step 1306, the vulnerability checker module 1106 retrieves risk information associated with attributes from the identifier module 1104. In some embodiments, the vulnerability checker module 1106 retrieves risk information based on an application identifier and/or at least one attribute (e.g., version number). The vulnerability checker module 1106 may retrieve the risk information from the vulnerability database 1114 based on any information.

In step 1308, the vulnerability checker module 1106 identifies risks associated with the application to be launched based on risk information. The risk information may include a CVSS score, whether there are any known vulnerabilities associated with the launching application, number of such vulnerabilities, known public exploits, number of days one or more vulnerabilities since the vulnerabilit(ies) were first detected, and the like.

In step 1310, the rule module 1108 retrieves one or more rules associated with risk information. The rules module 1108 may retrieve one or more rules from a rules database 1116 or from any data structure. The one or more rules may comprise instructions or policies that govern the application to be launched. For example, one rule may include instructions to block the launch of the application based on the risk information (e.g., a critical vulnerability is associated with the version of the application to be launched or a CVSS score is too high).

In some embodiments, the rules allow the rules module 1108 to generate instructions to the control module 1110 to control the application.

In step 1312, the control module 1110 controls execution or launch of the legitimate application based on the retrieved rules. In various embodiments, the control module 1110 may allow or instruct the application to launch without modification. The control module 1110, based on the applicable rules, may block the application from launching, terminate the application, or modify permissions associated with the launching application.

Figure 14:
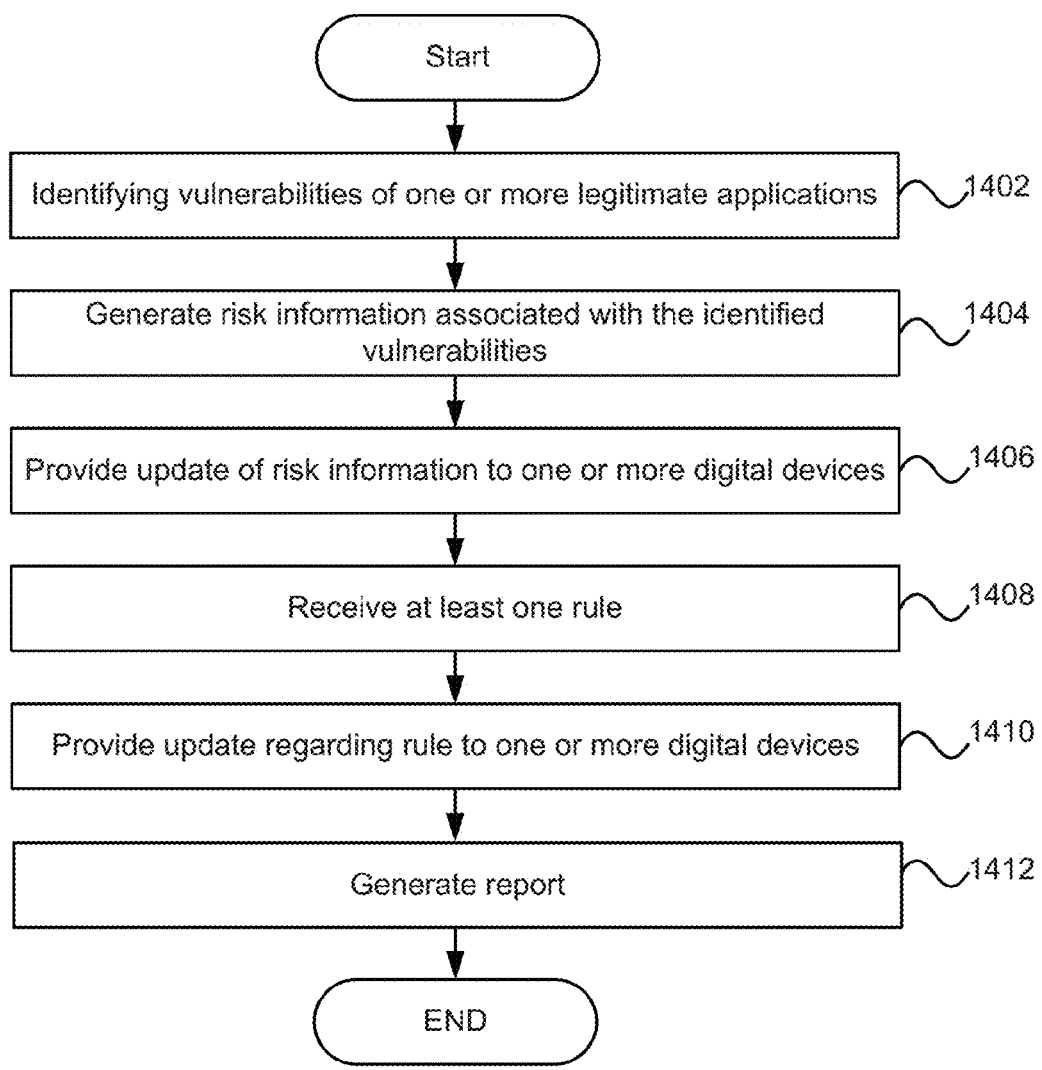
FIG. 14 is a flowchart for updating risk information and rules in some embodiments.

FIG. 14 is a flowchart for updating risk information and rules in some embodiments. In step 1402, the risk assessment module 1202 identifies vulnerabilities of one or more legitimate applications. For example, the risk assessment module 1202 may retrieve security, vulnerability, and other information from any number of sources. In some embodiments, administrators and security experts acquire security information from any number of sources and provide the information to the risk assessment module 1202. In some embodiments, the risk API module 1204 identifies and retrieves vulnerability and/or security information from one or more different sites utilizing one or more API(s).

In step 1404, the risk assessment module 1202, the risk API module 1204, and/or the record module 1208 generate (e.g., format and/or organize) risk information associated with identified vulnerabilities. In one example, the record module 1208 formats information retrieved or received to generate and/or provide risk information to be distributed to one or more digital devices. In step 1406, the vulnerability update module 1208 provides risk information updates to one or more digital devices.

In step 1408, the rules generation module 1206 generates or receives at least one rule associated with risk information. The rules generation module 1206 may generate at least one rule such that the rule may be retrieved based on risk information, application identifier, and/or attributes associated with the application. In step 1410, the rules update module 1210 provides the rule updates to one or more digital devices.

In step 1412, the security server 1200 may generate a report regarding the risk information, rules generated, and/or digital devices. In one example, the report may detail past and present risk information and allow an administrator to alter, update, modify, add, or delete all or part of the risk information. In some embodiments, the report may detail past and recently determined rules. The report may allow an administrator to alter, update, modify, add, or delete all or part of the rules. The report may optionally track what risk information and/or rules have been provided to any number of digital devices, including digital device identifiers, and/or subsets of digital devices. The report may optionally detail detected vulnerabilities associated with applications and/or digital devices, including any action taken by the agent 1004 and/or actions by security software (e.g., quarantine).

Figure 15:
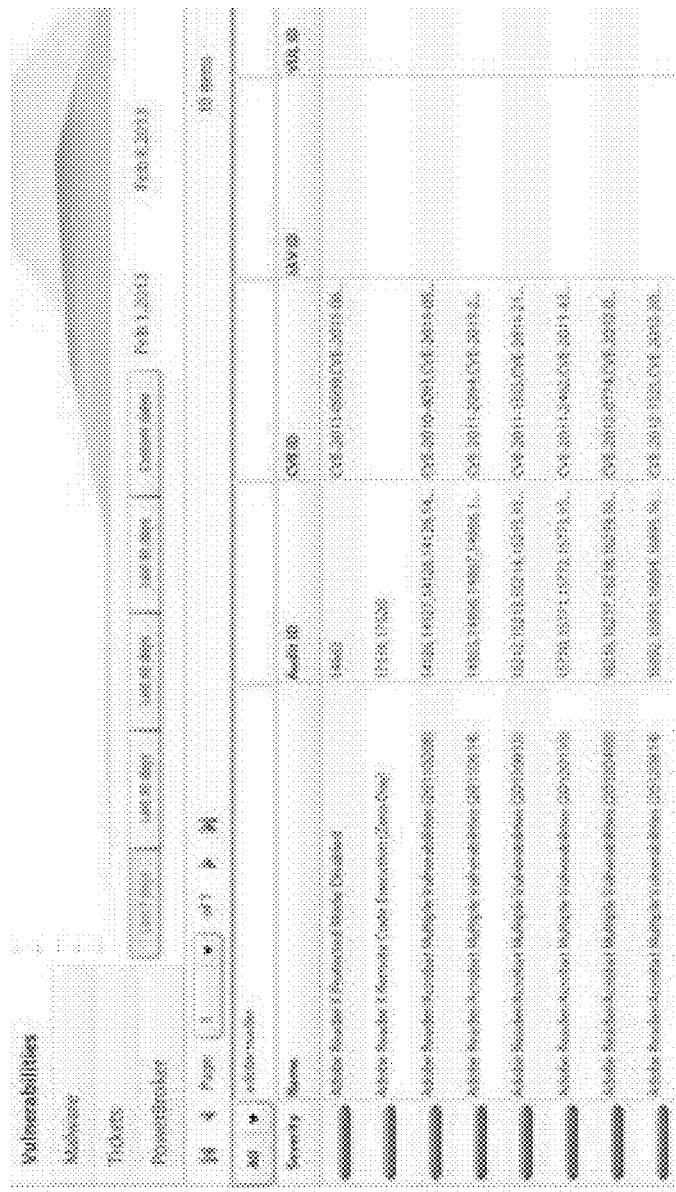
FIG. 15 is an exemplary vulnerability interface identifying vulnerabilities of legitimate applications in some embodiments.

FIG. 15 is an exemplary vulnerability interface identifying vulnerabilities of legitimate applications in some embodiments. In FIG. 15, the vulnerability interface may be generated by the security server 1200 and may list known vulnerabilities identified or detected by the risk assessment module 1202 and/or risk API module 1204. The vulnerability interface allows the user or administrator to view identified and/or detected vulnerabilities organized by application name, audit ID, event ID, degree of severity, and/or any other information. The administrator may also request to view vulnerabilities identified by the security server 1200 over the last seven days, last thirty days, last sixty days, last ninety days, or over a custom defined date range.

Figure 16:
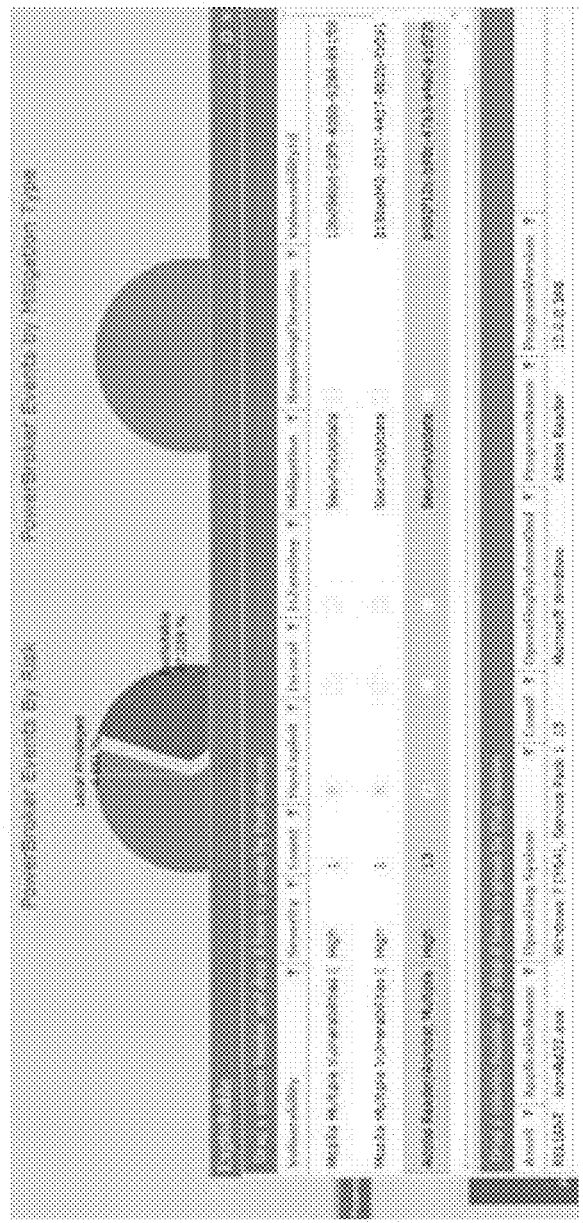
FIG. 16 is an exemplary report generated by the security server in some embodiments.

FIG. 16 is an exemplary report generated by the security server in some embodiments. In FIG. 16, the exemplary report allows the user or administrator to organize identified and/or detected vulnerabilities base on risk information such as severity, number of vulnerabilities associated with an application version, whether there has been public exploits, if one or more vulnerabilities are zero day, has been exploited locally, and any action that may be correctable (e.g., available patches). The report may also include an identifier associated with vulnerabilities. This report may occur at the management level and provide actionable status regarding applications executed and the vulnerabilities present within the launched applications.

The above-described functions and components can comprise instructions that are stored on a storage medium such as a computer readable medium. Some examples of instructions include software, program code, and firmware. The instructions can be retrieved and executed by a processor in many ways.

The present invention is described above with reference to exemplary embodiments. It will be apparent to those skilled in the art that various modifications may be made and other embodiments can be used without departing from the broader scope of the present invention. Therefore, these and other variations upon the exemplary embodiments are intended to be covered by the present invention.

The invention claimed is:

1. An agent comprising:
 a monitor module, executing on a computing device, configured to monitor the computing device for an instruction to execute a legitimate application on the computing device, the legitimate application comprising a non-malware application;
 an application identification module configured to identify one or more attributes of the legitimate application;
 a vulnerability module configured to retrieve risk information based on the one or more attributes of the legitimate application, the risk information determined from known vulnerabilities of the legitimate application, the risk information including a risk value associated with the legitimate application;
 a rules database for storing a rule associated with the risk information; and
 a rule module configured to retrieve the rule from the rules database based on the risk information and to control the legitimate application based on a comparison of the risk value and a predetermined threshold risk value defined by the rule.

2. The agent of claim 1, wherein the rule module configured to control the legitimate application comprises blocking the legitimate application from executing.

3. The agent of claim 1, wherein the rule module configured to control the legitimate application comprises allowing the legitimate application to execute.

4. The agent of claim 1, wherein the rule module configured to control the legitimate application comprises allowing the legitimate application to execute but blocking some functionality of the legitimate application from executing.

5. The agent of claim 1, wherein the monitor module configured to monitor the computing device for an instruction to execute the legitimate application comprises the monitor module intercepting instructions being provided to or from an operating system of the computing device.

6. The agent of claim 1, wherein one of the one or more attributes is an application identifier.

7. The agent of claim 1, wherein one of the one or more attributes is an application version identifier.

8. The agent of claim 1, wherein the rule comprises an instruction to block all or part of execution of the legitimate application if the risk information indicates, at least in part, that a vulnerability associated with the legitimate application was publicly disclosed before a predetermined date.

9. The agent of claim 8, wherein the predetermined date is calculated as occurring at a period of time before a current date.

10. The agent of claim 1, wherein the rule comprises an instruction to block all or part of execution of the legitimate application if the risk information indicates, at least in part, that a public exploit of a vulnerability associated with the legitimate application exists.

11. The agent of claim 1, wherein the rule comprises an instruction to block all or part of execution of the legitimate application if the risk information indicates, at least in part, that a vulnerability associated with the legitimate application was identified before a predetermined period of time.

12. The agent of claim 1, wherein the rule is applicable to multiple different legitimate applications on the computing device.

13. The agent of claim 1, wherein the rule module is configured to retrieve a plurality of rules from the rule database, each of the plurality of rules associated with the risk information.

14. The agent of claim 13, wherein the rule module configured to control the legitimate application based on the comparison of the risk value and the predetermined threshold risk value defined by the rule comprises controlling the legitimate application based on the comparison of the risk value and the predetermined threshold risk value defined by a strictest rule of the plurality of rules.

15. The agent of claim 1, wherein the risk information comprises a risk value and the rule comprises instructions regarding control of the legitimate application based on the risk value.

16. A method comprising:
monitoring, via a processor, a computing device for an instruction to execute a legitimate application on the computing device, the legitimate application comprising a non-malware application;
identifying one or more attributes of the legitimate application;
retrieving risk information based on the one or more attributes of the legitimate application, the risk information determined from known vulnerabilities of the legitimate application, the risk information including a risk value associated with the legitimate application;
storing a rule associated with the risk information;
retrieving the rule from the rule database based on the risk information; and
controlling the legitimate application based on a comparison of the risk value and a predetermined threshold risk value defined by the rule.

17. The method of claim 16, wherein controlling the legitimate application comprises blocking the legitimate application from executing.

18. The method of claim 16, wherein the controlling the legitimate application comprises allowing the legitimate application to execute.

19. The method of claim 16, wherein the controlling the legitimate application rule comprises allowing the legitimate application to execute but blocking some functionality of the legitimate application from executing.

20. The method of claim 16, wherein the monitoring the device for an instruction to execute the legitimate application comprises intercepting instructions being provided to or from an operating system of the computing device.

21. The method of claim 16, wherein one of the one or more attributes is an application identifier.

22. The method of claim 16, wherein one of the one or more attributes is an application version identifier.

23. The method of claim 16, wherein the rule comprises an instruction to block all or part of execution of the legitimate application if the risk information indicates, at least in part, that a vulnerability associated with the legitimate application was publicly disclosed before a predetermined date.

24. The method of claim 23, wherein the predetermined date is calculated as occurring at a period of time before a current date.

25. The method of claim 16, wherein the rule comprises an instruction to block all or part of execution of the legitimate application if the risk information indicates, at least in part, that a public exploit of a vulnerability associated with the legitimate application exists.

26. The method of claim 16, wherein the rule comprises an instruction to block all or part of execution of the legitimate application if the risk information indicates, at least in part, that a vulnerability associated with the legitimate application was identified before a predetermined period of time.

27. The method of claim 16, wherein the rule is applicable to multiple different legitimate applications on the computing device.

28. The method of claim 16, wherein retrieving the rule comprises retrieving a plurality of rules from the rule database, each of the plurality of rules associated with the risk information.

29. The method of claim 28, wherein controlling the legitimate application based on the comparison of the risk value and the predetermined threshold risk value defined by the rule comprises controlling the legitimate application based on the comparison of the risk value and the predetermined threshold risk value defined by a strictest rule of the plurality of rules.

30. The method of claim 16, wherein the risk information comprises a risk value and the rule comprises instructions regarding control of the legitimate application based on the risk value.

31. A non-transitory computer readable medium comprising instructions executable by a processor to perform a method, the method comprising:
monitoring a computing device for an instruction to execute a legitimate application on the computing device, the legitimate application comprising a non-malware application;
identifying one or more attributes of the legitimate application;
retrieving risk information based on the one or more attributes of the legitimate application, the risk information determined from known vulnerabilities of the legitimate application, the risk information including a risk value associated with the legitimate application;
storing a rule associated with the risk information;
retrieving the rule from the rule database based on the risk information; and
controlling the legitimate application based on a comparison of the risk value and a predetermined threshold risk value defined by the rule.

* * * * *